US011671168B2

(12) United States Patent
Tekgul et al.

(10) Patent No.: US 11,671,168 B2
(45) Date of Patent: Jun. 6, 2023

(54) RELAY WITH A CONFIGURABLE MODE OF OPERATION

(71) Applicant: QUALCOMM Incorporated, San Diego, CA (US)

(72) Inventors: Ezgi Tekgul, Austin, TX (US); Navid Abedini, Somerset, NJ (US); Jianghong Luo, Skillman, NJ (US); Naeem Akl, Somerville, NJ (US); Raju Hormis, New York, NY (US); Ashwin Sampath, Skillman, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/009,674

(22) Filed: Sep. 1, 2020

(65) Prior Publication Data

US 2021/0075497 A1    Mar. 11, 2021

Related U.S. Application Data

(60) Provisional application No. 62/896,532, filed on Sep. 5, 2019.

(51) Int. Cl.
*H04W 88/04* (2009.01)
*H04B 7/155* (2006.01)
*H04W 72/51* (2023.01)
*H04W 72/541* (2023.01)

(52) U.S. Cl.
CPC ........ *H04B 7/15557* (2013.01); *H04W 72/51* (2023.01); *H04W 72/541* (2023.01); *H04W 88/04* (2013.01)

(58) Field of Classification Search
CPC .............................. H04B 7/155; H04W 88/04
See application file for complete search history.

(56) References Cited

U.S. PATENT DOCUMENTS

| 8,976,806 | B2 * | 3/2015 | Pasad .................... H04W 88/04 370/479 |
| 2011/0273999 | A1 | 11/2011 | Nagaraja |

(Continued)

FOREIGN PATENT DOCUMENTS

| WO | 2015078483 A1 | 6/2015 |
| WO | 2020/022330 A1 | 1/2020 |

OTHER PUBLICATIONS

International Search Report and Written Opinion—PCT/US2020/049083—ISA/EPO—dated Jan. 18, 2021.

(Continued)

*Primary Examiner* — Sulaiman Nooristany
(74) *Attorney, Agent, or Firm* — Arent Fox, LLP

(57) ABSTRACT

A relay supporting multiple relay modes is provided. The relay transmits capability information to a base station, the capability information indicating support for a first relay mode and a second relay mode. The relay determines a mode of operation, either on its own or based on an indication of a mode of operation from the base station, wherein the mode of operation comprises the first relay mode or the second relay mode. The relay communicates with at least one of the base station or another wireless device based at least in part on the determined mode of operation.

56 Claims, 15 Drawing Sheets

(56) References Cited

U.S. PATENT DOCUMENTS

2014/0348055 A1* 11/2014 Hoymann .......... H04B 7/15557
 370/315
2019/0281644 A1* 9/2019 Hu ..................... H04B 7/15585
2019/0335388 A1* 10/2019 Bulakci ................ H04W 24/02
2021/0075497 A1 3/2021 Tekgul et al.
2021/0203406 A1 7/2021 Tekgul
2021/0344381 A1 11/2021 Miyamoto et al.

OTHER PUBLICATIONS

Partial International Search Report—PCT/US2020/049083—ISA/EPO—dated Nov. 12, 2020.
International Search Report and Written Opinion dated Jun. 10, 2022 from corresponding PCT Application No. PCT/US2022/071193.

* cited by examiner

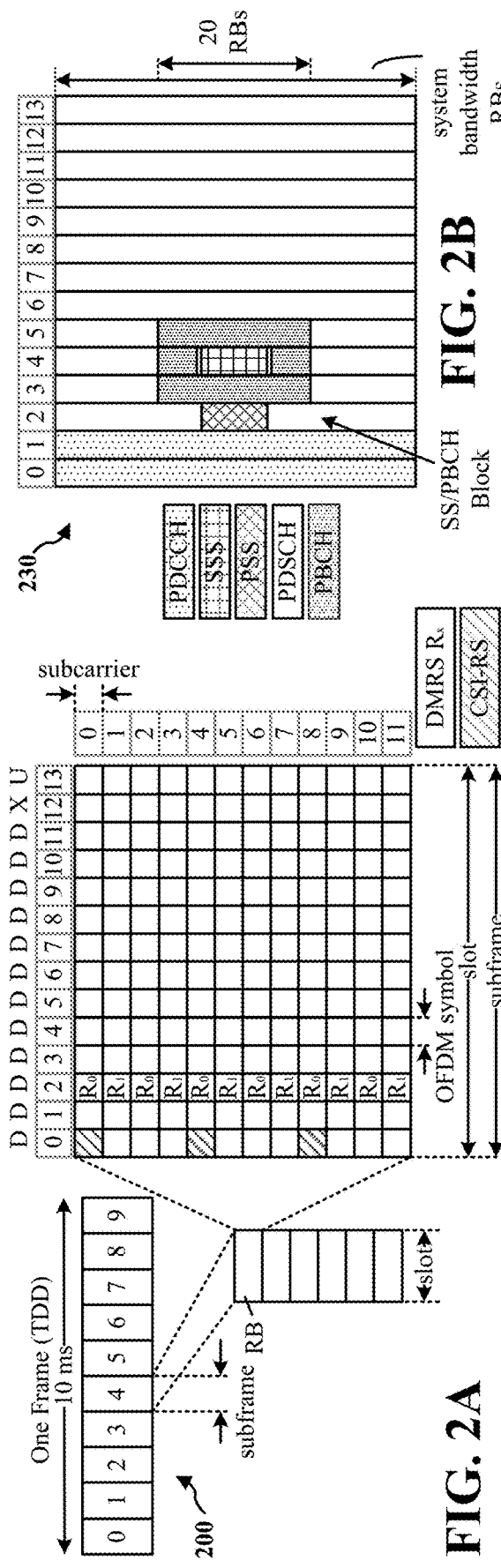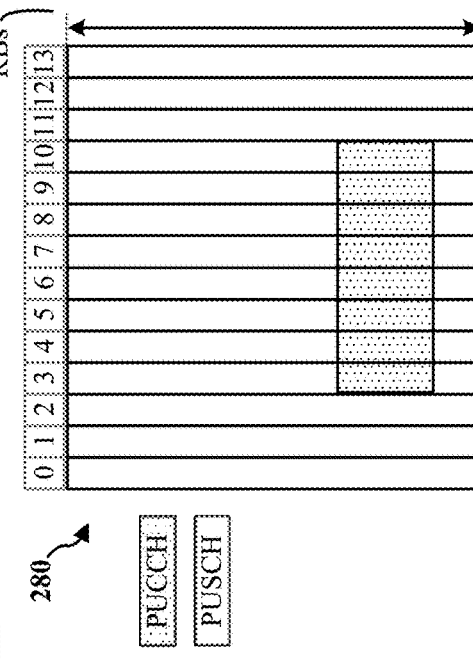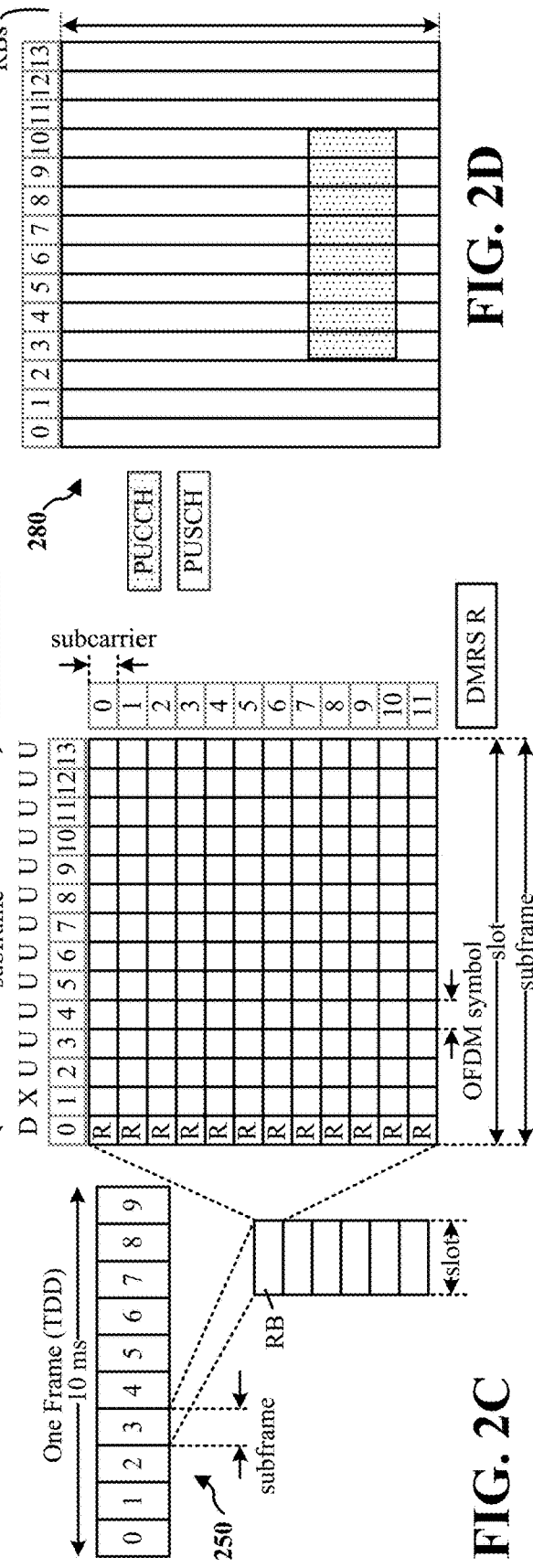
FIG. 2A  FIG. 2B  FIG. 2C  FIG. 2D

RELAY WITH A CONFIGURABLE MODE OF OPERATION

CROSS-REFERENCE TO RELATED APPLICATION(S)

This application claims the benefit of U.S. Provisional Application Ser. No. 62/896,532, entitled "RELAY WITH A CONFIGURABLE MODE OF OPERATION" and filed on Sep. 5, 2019, which is expressly incorporated by reference herein in its entirety.

BACKGROUND

Technical Field

The present disclosure relates generally to communication systems, and more particularly, to wireless communication including a relay or a repeater.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A relay forwarding communications between a base station and a UE using an amplify-forward scheme may introduce noise into the communication. A relay forwarding communications between a base station and a UE using a decode-forward scheme may introduce latency and/or self-interference noise into the communication.

According to aspects of the present disclosure, a relay supporting multiple relay modes is provided. The relay transmits capability information to a base station. The capability information indicates support for a first relay mode (e.g., an amplify-forward mode) and a second relay mode (e.g., a decode-forward mode), and may provide other information on capabilities of the relay. The relay determines a mode of operation, wherein the mode of operation comprises the first relay mode or the second relay mode. The relay may determine the mode of operation by selecting a mode of operation by itself, or may determine the mode of operation by receiving an indication of a mode of operation from the base station. The relay communicates with at least one of the base station or another wireless device based at least in part on the determined mode of operation. In an aspect of the disclosure, a method, a computer-readable medium, and an apparatus are provided for wireless communication at a base station. The apparatus receives capability information from a relay node, the capability information indicating support for a first relay mode and a second relay mode. The apparatus determines a mode of operation for the relay node, wherein the mode of operation comprises the first relay mode or the second relay mode. The apparatus communicates with the relay node based at least in part on the determined mode of operation.

In another aspect of the disclosure, a method, a computer-readable medium, and an apparatus are provided for wireless communication at a relay node. The apparatus transmits capability information to a base station, the capability information indicating support for a first relay mode and a second relay mode. The apparatus determines a mode of operation, wherein the mode of operation comprises the first relay mode or the second relay mode. The apparatus communicates with at least one of the base station or another wireless device based at least in part on the determined mode of operation.

In other aspect of the disclosure, a method, a computer-readable medium, and an apparatus are provided for wireless communication at a wireless device served by a relay node. The apparatus receives an indication of a mode of operation for the relay node from a first relay mode to a second relay mode, and determines at least one parameter for communicating with the relay node based on the mode of operation indicated for the relay node.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
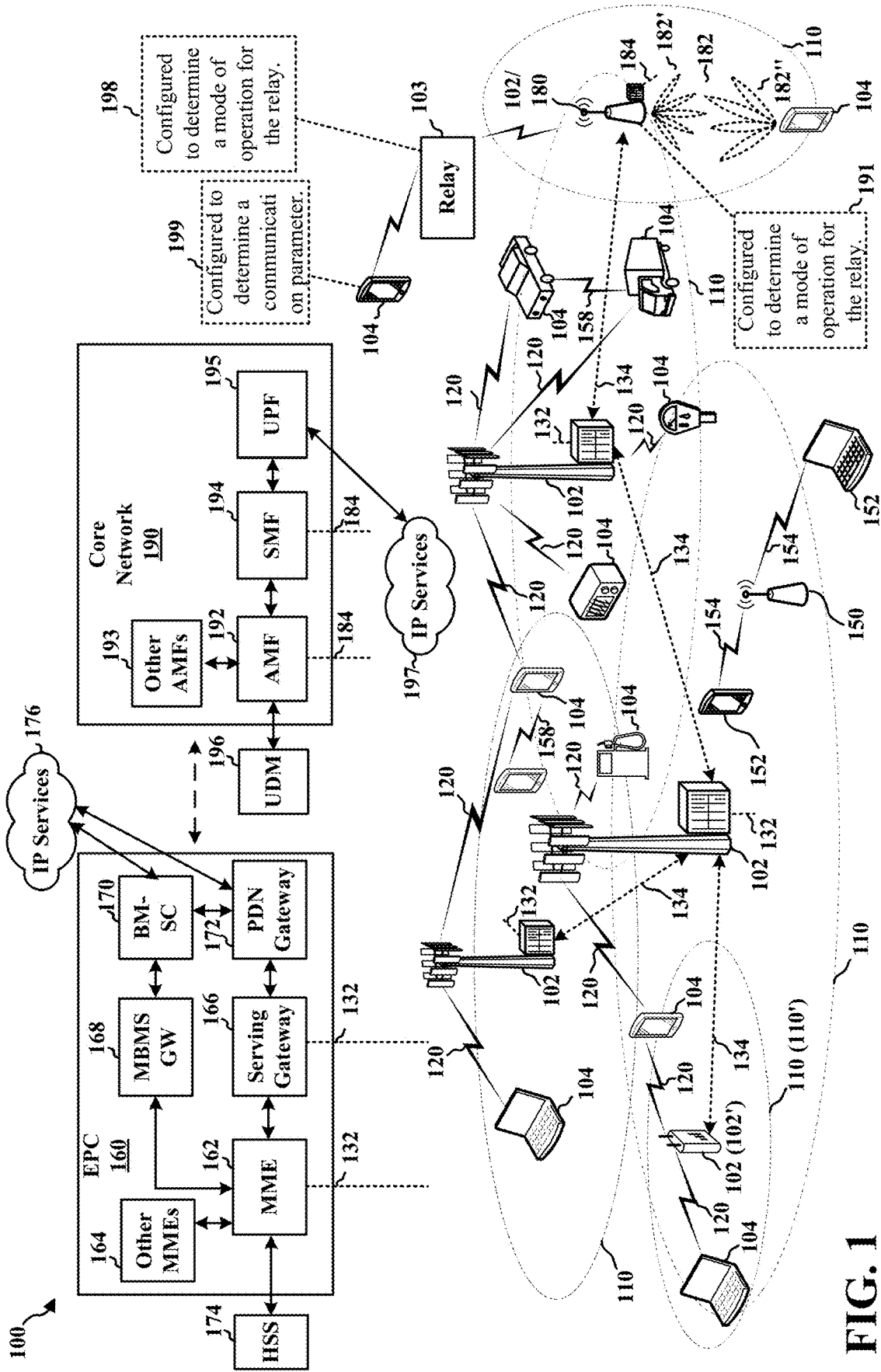
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a relay 103 may receive a signal from a base station 102, 180 and may relay the signal to a UE 104, and/or may receive a signal from the UE 104 and may relay the signal to another UE. The base station 102, 180 may be configured to determine a mode of operation for the relay 103 and communicate using the determined mode of operation (191). The relay 103 may be configured to determine a mode of operation for itself and communicate using the determined mode of operation (198). The UE 104 may be configured to determine a parameter for communicating with the relay 103 based on the determined mode of operation (199). Although the following description may be focused on a mmW relay including amplify-forward and decode-forward modes, the concepts described herein may be applicable to other similar areas, such as low-frequency repeaters.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame.

The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
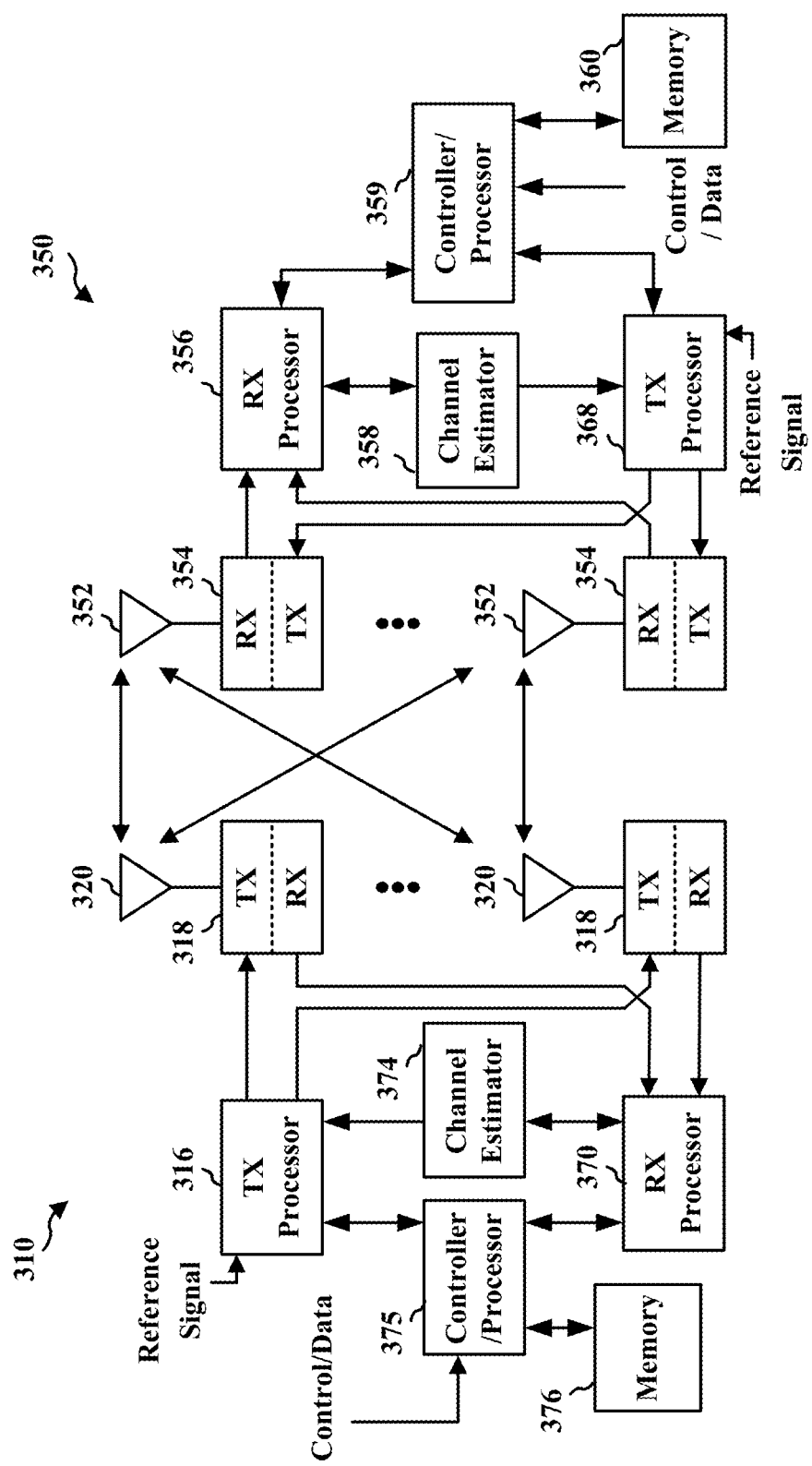
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC

160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

A mobile communication system may include a relay. A relay may also be referred to as a repeater. A relay may assist in forwarding messages between a base station and a UE. The base station may transmit a message for the UE. The relay may receive the message for the UE and may re-transmit the message to the UE. The UE may transmit a message for the base station, and the relay may receive the message for the base station and re-transmit the message to the base station. Similarly, the relay may additionally or alternatively receive a message from a UE and re-transmit the message to another UE. In some aspects, a relay may receive and re-transmit messages in a high-frequency spectrum (e.g., the relay may be a mmW relay).

In some aspects, a relay may receive an analog signal on a fixed beam direction, amplify the power of the received analog signal to generate a repeat signal, and forward the repeat signal on a fixed beam direction (e.g., may operate in an amplify-forward mode). Such a relay may be referred to herein as a Class A relay. A Class A relay may operate without control from the base station, as its operation may not be dynamically configurable. A Class A relay may operate in full duplex mode (e.g., may simultaneously receive the received signal and transmit the repeat signal) as the relay does not perform additional processing of the received signal to generate the repeat signal.

In some aspects, a relay may receive an analog signal, amplify the power of the received analog signal to generate a repeat signal, and forward the repeat signal (e.g., may operate in an amplify forward mode), and may be capable of receiving some control by a base station. For example, the base station may control a beam used by the relay, e.g. the send and/or receive beam direction. The base station may control whether the relay is relaying uplink messages from a UE to the base station or downlink messages from the base station to a UE. Such a relay may be referred to herein as a Class B relay. A Class B relay may operate in a full duplex mode (e.g., may simultaneously receive the received signal and transmit the repeat signal) as the relay does not perform additional processing of the received signal to generate the repeat signal. Therefore, the Class B relay may have a higher system capacity and lower forwarding latency than classes of relays, e.g., a relay operating in half-duplex mode. As the Class B relay amplifies and forwards the received signal, noise and interference in the received signal may be included in the repeat signal which may reduce the overall effective SINR of the Class B relay.

In some aspects, a relay may receive a signal, decode the signal, and forward a re-encoded signal or a new signal based on the decoded signal. Such a relay may be referred to herein as a Class C relay. A Class C relay may perform digital baseband processing of the received signal. A Class C relay may perform scheduling, such as MAC scheduling, based on the decoded signal. In some aspects, a Class C relay may be an integrated access and backhaul (IAB) node.

A Class C relay may operate in half-duplex mode. Processing of the received signal and/or waiting for resources to receive or transmit signals during half-duplex operation may introduce latency caused by processing at a Class C relay that is not present in communication relayed by amplify-forward relays such as Class B relays. The repeat message sent by a Class C relay may have a lower SINR than a repeat message sent by a Class B relay because decoding the received message and re-encoding the message to generate the repeat message may remove noise and interference on the received signal. Further, half-duplex operation of the Class C relay may reduce or eliminate issues such as self-interference.

Figure 4:
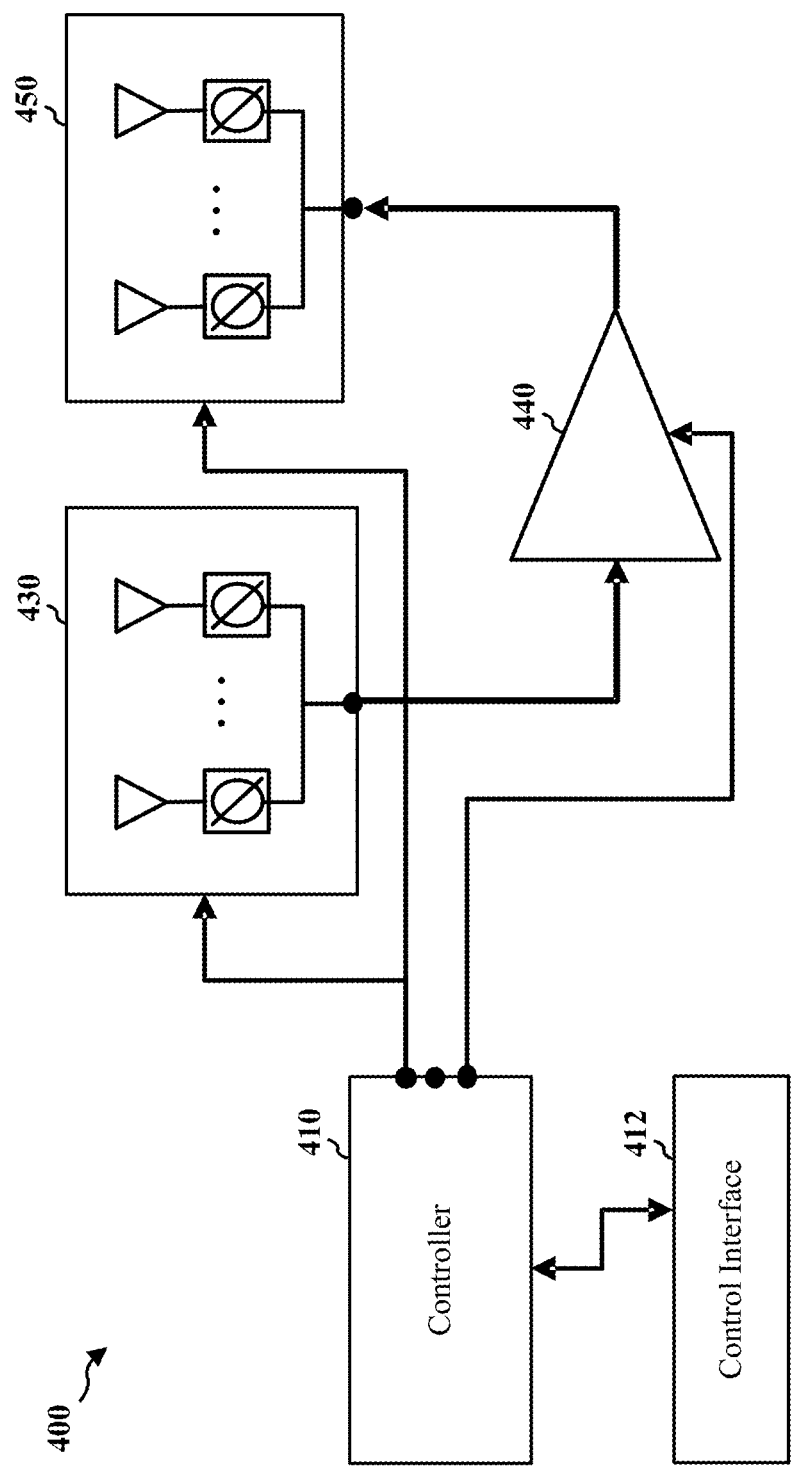
FIG. 4 illustrates a Class B relay.

FIG. 4 illustrates a Class B relay 400. The Class B relay may include a controller 410, a control interface 412, a receive antenna array 430, an amplifier 440, and a transmit antenna array 450. The receive antenna array 430 and/or the transmit antenna array 450 may be phased antenna arrays. The controller 410 may control the receive antenna array 430 and the transmit antenna array 450. For example, the controller 410 may control which beam the receive antenna array 430 is receiving signals on and may control which beam the transmit antenna array 450 is transmitting signals on.

The Class B relay 400 may receive an analog signal on the receive antenna array 430, e.g., based on the configured reception beam. In some aspects, a base station may transmit the signal to the Class B relay 400. In some aspects, a UE may transmit the signal to the Class B relay 400. The receive antenna array 430 may provide the received signal to the amplifier 440. The amplifier 440 may comprise a variable gain amplifier having a gain set by the controller 410. The amplifier 440 may amplify the received analog signal according to the gain to generate the repeat signal and may forward the repeat signal to transmit antenna array 450. The transmit antenna array 450 may then transmit the repeat signal, e.g., based on a configured transmission beam. In some aspects, where a base station transmitted the signal to the Class B relay 400, the transmit antenna array 450 may transmit the repeat signal to a UE. In some aspects, where a UE transmitted the signal to the Class B relay 400, the transmit antenna array 450 may transmit the repeat signal to a base station or to another UE.

Another node may transmit a control signal to the Class B relay 400. For example, a donor node, a control node, etc. may provide control information to the Class B relay. The Class B relay 400 may receive the control signal at the control interface 412. The controller 410 may control elements of the Class B relay based on the control signal. For example, the control signal may instruct the controller 410 to control the receive antenna array 430 to receive on a specific beam, may instruct the controller 410 to control the transmit antenna array 450 to transmit on a specific beam, and/or may instruct the controller 410 to utilize a specific gain at the amplifier 440.

In some aspects, the control interface 412 may operate using a different RAT than the communication that is being relayed. For example, the control interface 412 may include a separate modem (e.g., a low-frequency modem) for receiving the control signal. For example, in some aspects, the Class B relay 400 may be a mmW repeater and the control interface 412 may include a Bluetooth modem, a narrowband IOT LTE modem, or a lower-frequency NR modem for receiving the control signal via the control interface 412. In some aspects, the control interface may receive control signals that are in-band with a signal transmitted to the Class B relay 400 for forwarding to a UE (e.g., on a narrow bandwidth part of the same carrier frequency). In some aspects, the Class B relay 400 may be a mmW repeater and a base station may send a control signal to the Class B relay 400 using a mmW carrier.

Figure 5:
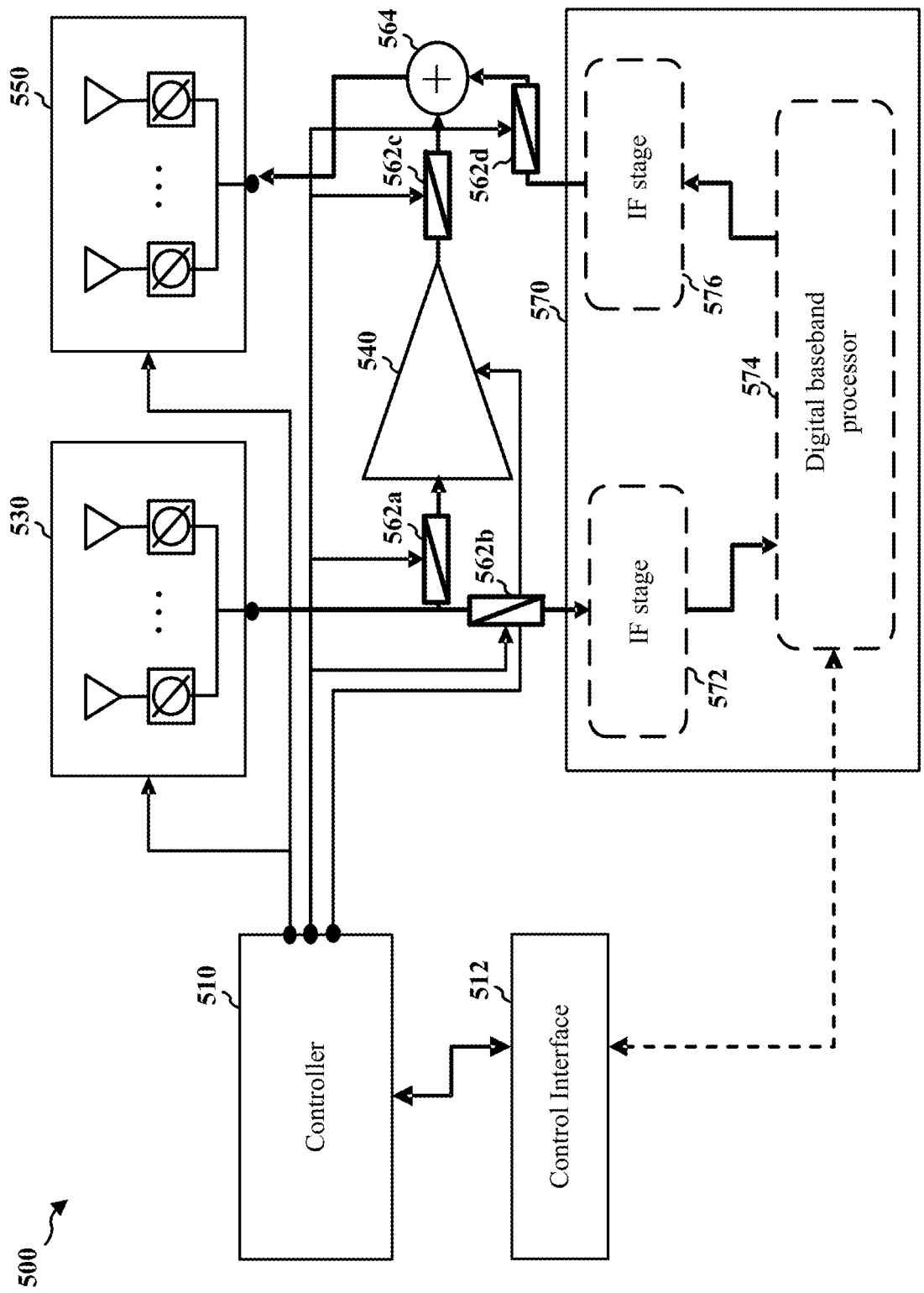
FIG. 5 illustrates a relay supporting operation in an amplify-forward mode and a decode-forward mode.

FIG. 5 illustrates a relay 500. The relay 500 may include a controller 510, a control interface 512, a receive antenna array 530, an amplifier 540, a transmit antenna array 550, switches 562a-d, and digital processing block 570.

The controller 510 may control the receive antenna array 530 and the transmit antenna array 550. For example, the controller 510 may control which beam the receive antenna array 530 uses to receive signals on and may control which beam the transmit antenna array 550 uses to transmit signals. The receive antenna array 530 and/or the transmit antenna array 550 may comprise phased antenna arrays.

The relay 500 may support operation in an amplify-forward mode where a received signal is amplified and forwarded (e.g., similar to a Class B relay described supra) and operation in a decode-forward mode where a received signal is decoded and a message is forwarded based on the decoded message (e.g., similar to a Class C relay described supra). An amplify and forward-mode may employ a full duplex operation, and the decode-forward mode may employ a half-duplex operation. The controller 510 may control switches 562a-d. The controller 510 may close switch 562a and switch 562c and may open switch 562b and switch 562d to cause the relay 500 to operate in the amplify-forward mode. The controller 510 may close switch 562b and switch 562d and may open switch 562a and switch 562c to cause the relay 500 to operate in the decode-forward mode. In some aspects, the controller 510 may operate the relay 500 in a full-duplex mode when the relay 500 operates in amplify-forward mode and may operate the relay 500 in a half-duplex mode when the relay 500 operates in decode-forward mode. In some aspects, the controller 510 may open all of switches 562a-d to forward the received analog signal as the amplified repeat signal and perform digital processing on the received analog signal. Where the digital processing block 570 is processing the received signal but the amplifier 540 is amplifying and forwarding the received signal to the transmit antenna array 550, switch 562d may be open or closed, and the digital processing block 570 may not forward a signal through the switch 562d.

In some aspects, the relay 500 may receive a received signal from a base station which includes relay control data and data for a served wireless device, e.g., a UE. For example, the base station may multiplex the relay control data and the data for the served wireless device in the frequency domain. The controller 510 may open all of switches 562a-d, the digital processing block 570 may decode and extract the relay control data and forward the relay control data to the control interface, and the amplifier 540 may amplify and forward the received signal to the transmit antenna array 550 for transmission to the intended wireless device. The relay control data may include data such as reference signals (e.g., synchronous signal block), broadcast signals (e.g., system information), or multicast control messages which may be used by both the relay 500 and the served wireless device.

The relay 500 may receive an analog signal on the receive antenna array 530, e.g., based on the configured reception beam. In some aspects, a base station may transmit the signal to the relay 500. In some aspects, a UE or another relay node may transmit the signal to the relay 500.

When switch 562a and switch 562c are closed and switch 562b and switch 562d are open (e.g., when the controller 510 closes switch 562a and switch 562c and opens switch 562b and switch 562d), the receive antenna array 530 may provide the received signal to the amplifier 540. The amplifier 540 may comprise a variable gain amplifier having a gain set by the controller 510. The amplifier 540 may amplify the received analog signal according to the gain to generate the repeat signal and may forward the repeat signal to transmit antenna array 550 through mixer 564.

When switch 562b and switch 562d are closed and switch 562a and switch 562c are open (e.g., when the controller 510 closes switch 562b and switch 562d and opens switch 562a and switch 562c), the receive antenna array 530 may provide the received signal to the digital processing block 570. The digital processing block 570 may demodulate, decode, encode, and modulate the received signal to generate the repeat signal. In some aspects, the digital processing block 570 encodes the decoded signal. In some aspects, the digital processing block 570 modifies the decoded signal to generate a new digital signal and encodes the new digital signal to generate the repeat signal. The processing at the digital processing block 570 may be adjusted based on control signaling received via the control interface 512. Control signaling may be received, for example, from a base station. The control interface may be based on a different RAT than the communication being relayed. The digital processing block 570 may provide the repeat signal to the transmit antenna array 550 through mixer 564.

In some aspects, the digital processing block 570 may include intermediate frequency (IF) stage 572, IF stage 576, and digital baseband processor 574. The IF stages 572 and 576 may include mixers, filters, analog-to-digital converters (ADC), and/or digital-to-analog converters (DAC).

The IF stage 572 may receive the RF received signal from the receive antenna array 530, may convert the RF received signal into a digital received signal, and may forward the digital received signal to the digital baseband processor 574. For example, the IF stage 572 may convert the RF received signal into an IF received signal and may convert the IF received signal into the digital received signal.

The digital baseband processor 574 may decode the digital received signal. The digital baseband processor 574 may then encode the decoded digital received signal to generate a digital repeat signal, or may modify the decoded digital received signal and encode the modified decoded digital received signal to generate the digital repeat signal. Aspects of the decoding and/or encoding of the signal may be controlled via control signaling received via the control interface. Control signaling may be received, for example, from a base station. The control interface may be based on a different RAT than the communication being relayed. The digital baseband processor 574 forwards the digital repeat signal to the IF stage 576.

The IF stage 576 may receive the digital repeat signal from the digital baseband processor 574, may convert the digital repeat signal into an IF repeat signal, and may convert the IF repeat signal into an RF repeat signal. The IF stage 576 may forward the RF repeat signal to the transmit antenna array 550 through the mixer 564.

Upon receiving the repeat signal from the mixer 564, the transmit antenna array 550 may transmit the repeat signal, e.g., based on a configured transmission beam. In some aspects, where the relay 500 received the initial signal from a base station, the transmit antenna array 550 may transmit the repeat signal to a UE or to a child node. In some aspects, where the relay 500 received the initial signal from a UE or child node, the transmit antenna array 550 may transmit the repeat signal to a base station or to a parent node.

Figure 6:
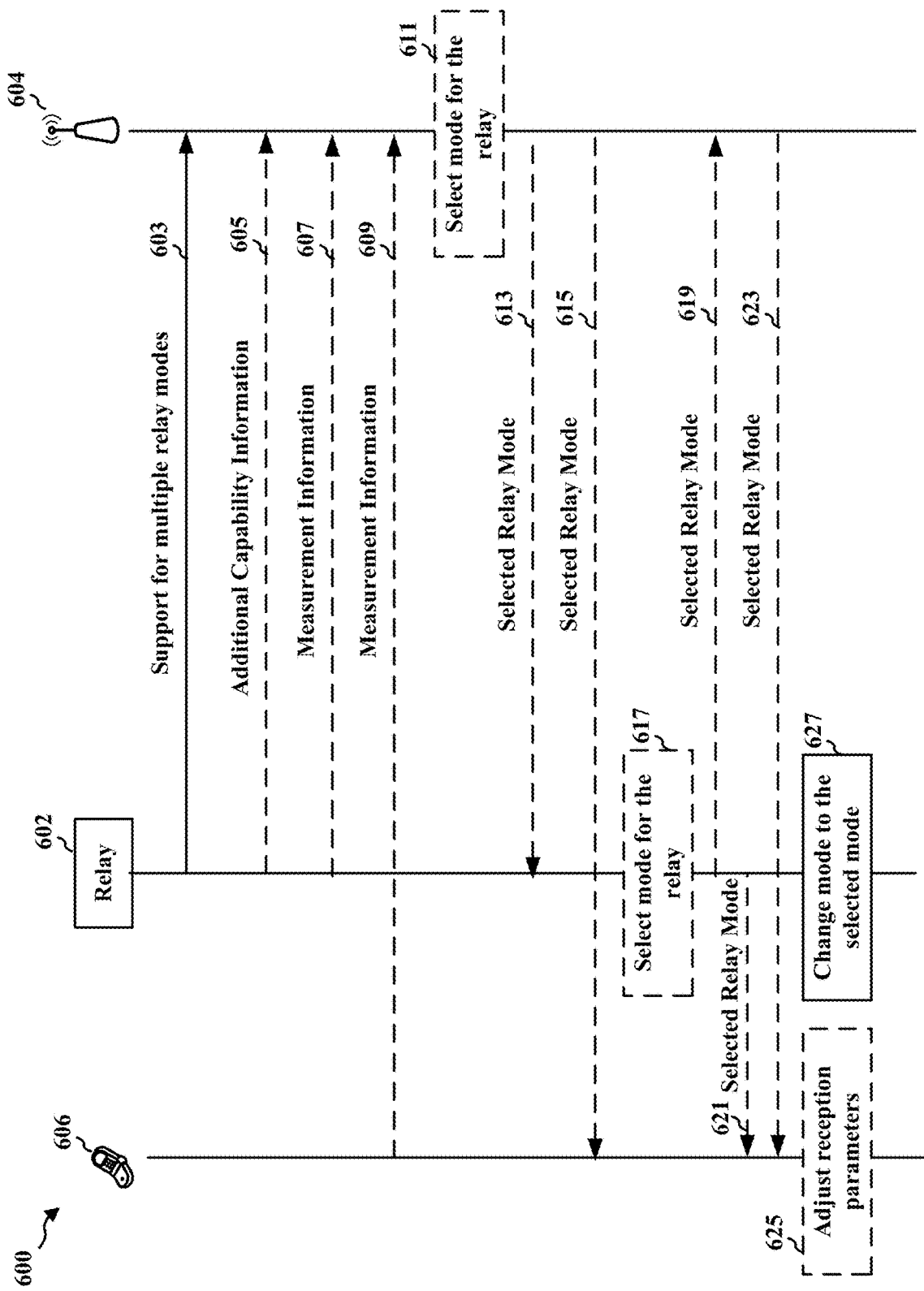
FIG. 6 is a communication diagram illustrating communication between a base station, a relay, and a UE that includes selection between multiple supported modes for the relay.

FIG. 6 is a communication diagram illustrating communication between a base station 604, a relay 602, and a UE 606 that includes selection between multiple supported modes for the relay 602. Although the aspects described in connection with FIG. 6 are described for communication relayed between a UE 606 and a base station 604, the aspects may similarly be applied to communication that the relay 602 relays between a base station 604 and a child node of the relay 602 or between a UE 606 and a parent node of the relay 602.

As illustrated at 603, the relay 602 may notify the base station 604 that the relay 602 supports multiple relay modes. For example, the relay 602 may be the relay 500 described above with respect to FIG. 5 and may indicate to the base station 604 that it supports amplify-forward and decode-forward modes and/or that it is capable of switching between the two modes.

In some aspects, the relay 602 may also communicate additional capability information to the base station 604, as illustrated at 605. In some aspects, the additional capability information 605 may indicate whether its capability to operate in a particular mode is beam dependent. For example, the additional capability information 605 may include eligible transmit and/or receive beams for use with a given mode of operation. For example, a first mode may be feasible or effective on a given transmit and/or receive beam while a second mode may not be feasible or effective on the given transmit and/or receive beam (e.g., where the first mode is a full-duplex/amplify-forward mode and the second mode is a half-duplex/decode-forward mode, transmit and receive beams which are close together may function in the first mode but may have too much self-interference to function effectively in the second mode). The relay 602 may communicate to the base station 604 that the given transmit and/or receive beams may be used when the relay 602 is operating in the first mode but may not be used when the relay 602 is operating in the second mode. In some aspects, the additional capability information 605 may include a noise figure, e.g., a loss in output SNR, for the relay 602. The noise figure may be based on a difference between an input SNR and an output SNR for the relay. The noise figure may be due to an internal impairment, e.g., internal noise, that reduces the SNR. In some aspects, the additional capability information 605 may include a maximum power gain and/or a maximum output power of the relay 602. In some aspects, the additional capability information 605 may include a the latency for the relay 602 to switch between modes.

In some aspects, the relay 602 may communicate measurement information 607 to the base station 604. The measurement information 607 may include measurements of the backhaul link between the relay 602 and the base station 604 (either directly linked or linked through one or more additional relays). The measurement information 607 may include measurements of the access link between the relay 602 and the UE 606 (either directly linked or linked through one or more additional relays). In some aspects, the relay 602 may operate in an amplify-forward mode and the measurement information may include a measured or estimated end-to-end signal to noise ratio when operating in the amplify-forward mode. In some aspects, the UE 606 may additionally or alternatively communicate such measurement information 609 to the base station 604. As noted above, the aspects illustrated for UE 606 may be performed by another relay node. Therefore, the base station may receive measurement information or other information from a relay node, and may use the information from the other relay node to determine the mode for relay 602.

In some aspects, the base station 604 may select a mode for the relay 602, as illustrated at 611, from the supported modes communicated by the relay 602. The base station 604 may select the mode, at 611, based on the additional information 605 provided to the base station 604 by the relay 602. Where the additional information 605 includes eligible transmit and/or receive beams for a given mode, the base station 604 may determine the transmit and/or receive beam over which a communication between the base station 604 and the UE 606 will be sent, and may select a mode for which those beams are eligible. Where the additional information 605 includes a noise figure for the relay 602, the base station 604 may use the noise figure to determine an anticipated SNR for a communication between the base station 604 and the UE 606 using an amplify-forward mode, and may select the amplify-forward mode if the anticipated SNR is above a threshold and may select another mode (e.g., a decode-forward mode) if the anticipated SNR is below the threshold.

The base station 604 may select the mode, at 611, based on the measurement information 609 provided to the base station 604 by the relay 602 and/or the measurement information 609 provided by the UE 606. For example, the base station 604 may use the measurement information 609 to determine or estimate the end-to-end quality of the link between the base station 604 and the UE 606, and may select an amplify-forward mode if the quality is above a threshold and may select a decode-forward mode if the quality is below the threshold. The base station 604 may measure uplink signals received from the UE 606 and may select the mode based on the measured uplink signals. For example, the relay 602 may forward the uplink signals from the UE 606 to the base station 604 using an amplify-forward mode, and the base station 604 may select an amplify-forward mode if the power and/or quality of the uplink signals are above a threshold or may select a decode-forward mode if the power and/or quality of the uplink signals are below the threshold. The UE 606 may measure downlink signals received from the base station 604, may report the measurements 609 of the downlink signals, and the base station 604 may select the mode, at 611, based on the measurements of the downlink signals. For example, the relay 602 may forward the downlink signals to the UE 606 using an amplify-forward mode, the UE 606 may report measurements of the downlink signals to the base station 604, and the base station 604 may select an amplify-forward mode if the power and/or quality (e.g., the SNR, reference signal received power, or received signal strength indicator) of the downlink signals are above a threshold or may select a decode-forward mode if the power and/or quality of the downlink signals are below the threshold. The base station 604 may select the mode, at 611, based on a quality of service (QoS) requirement for serving the UE 606. For example, where the QoS requirement for traffic from the UE 606 indicates that traffic from the UE should have a maximum latency or a maximum SNR, the base station 604 may select a mode capable of providing latency or SNR within the indicated limits.

The base station 604 may select the mode, at 611, based on a topology of a backhaul network which includes the relay 602. The base station 604 may consider the availability of other relays in the backhaul network and/or the associations between relays and UEs in selecting a mode for the relay 602. For example, the base station 604 may schedule communications with multiple UEs through all of the relays of the backhaul network, and the base station 604 may select the mode for the relay 602 based on a globally optimized solution for the scheduling.

Upon selecting the mode for the relay 602, the base station 604 may indicate the selected mode to the relay 602, e.g., in signaling 613. In some aspects, the base station 604 may communicate the selected mode dynamically, e.g. through an in-band control channel such as PDCCH. In some aspects, the base station 604 may communicate the selected mode semi-statically. In some aspects, the base station 604 may also communicate the selected mode to the UE 606. The base station 604 may also indicate the selected mode to a UE 606 or child node that is served by the relay 602, e.g., in signaling 615.

In some aspects, the relay 602 may select a mode for itself, as illustrated at 617. The base station 604 may provide results or parameters that are used by the relay 602 to select or determine the mode. The relay 602 may select its mode based on capabilities of the relay 602, including eligible transmit and/or receive beams for a given mode of operation, a noise figure for the relay 602, a maximum power gain and/or a maximum output power of the relay 602, and/or a latency of the relay 602 for switching between modes, e.g., as described in connection with the selection by the base station at 611. In some aspects, the relay 602 may collect measurement information and may select its mode based on the measurement information, e.g., as described in connection with the selection by the base station at 611. The measurement information may include measurements of the backhaul link between the relay 602 and the base station 604, measurements of the access link between the relay 602 and the UE 606, and/or an end-to-end signal to noise ratio when operating in an amplify-forward mode. The relay 602 may also receive measurement information from a UE 606 or child node.

The relay 602 may have a set mode for serving a given UE, and may select its mode based on the identity of the UE 606 being served. For example, the relay 602 may operate using an amplify-forward mode when serving UE1, may operate using a decode-forward mode when serving UE2, and may select the amplify-forward mode upon determining that the UE 606 is UE1.

The relay 602 may select its mode based on the physical channel over which a communication between the base station 604 and the UE 606 will be sent. The relay 602 may select an amplify-forward mode when it will be forwarding a communication over a control or a broadcast channel. The relay 602 may select a decode-forward mode when it will be forwarding a communication over a data channel.

The relay 602 may select its mode based on a QoS or traffic type for a communication between the base station 604 and the UE 606. The relay 602 may select an amplify-forward mode when the QoS or traffic type for the communication indicates that the communication is low latency traffic (e.g., URLLC traffic). The relay 602 may select a decode-forward mode when the QoS or traffic type does not indicate that the communication is low latency traffic (e.g., where the communication is eMBB traffic).

In some aspects, the relay 602 may have a default mode of operation and may operate in the default mode of operation unless certain criteria triggering another mode of operation are met. For example, the relay 602 may default to operating in a decode-forward mode, and may switch to an amplify-forward mode when the transmit and receive beam combination causes too much self-interference for the decode-forward mode or may switch to the amplify-forward mode when the QoS for traffic between the base station 604 and the UE 606 indicates that the traffic should have a low latency.

In response to selecting its mode of operation at 617, the relay 602 may indicate the selected mode to the base station 604, e.g., in signaling 619. In some aspects, the relay 602 may communicate the selected mode to the UE 606, e.g., in signaling 621. In some aspects, the relay 602 may indicate the selected mode to the base station 604, and the base station may indicate the relay's mode of operation to the UE 606, e.g., in signaling 623.

Upon selecting its mode of operation at 617 and communicating the selected mode of operation to the base station 604, or upon receiving the selected mode of operation from the base station at 613, the relay 602 may operate using the selected mode of operation. For example, the relay 602 may change from operation based on a first mode to operation based on a second mode at 627.

The base station 604 may schedule resources for the relay 602 or the UE 606 served by the relay 602 based at least in part on the determined mode of operation for the relay node, whether determined by the base station 604 or the relay 602. A communication rate, the scheduled resources, and/or a serving beam may be determined by the base station based on the determined mode of operation for the relay node.

The mode of operation used by the relay 602 when sending communications to the UE 606 may impact the performance of the UE 606. Different modes may have different effective SNRs, which may result in different achieved modulation and coding scheme (MCS) rates for the UE. Different modes may result in signals being received by the UE 606 at different times. Different modes may result in different amounts of interference observed by the UE 606.

In some aspects, the mode of operation for the relay 602 may be indicated to the UE 606 (e.g., at 615 or 621). In response to learning the mode of operation of the relay 602, whether the UE 606 received the indication of the selected mode from the base station 604 or the relay 602, the UE 606 may adjust reception parameters, at 625, for receiving a communication from the relay 602 or for transmitting communication to the relay 602 to accommodate using the selected mode. In some aspects, the UE 606 may send a first reference signal when processing a signal received from the relay 602 operating using a first mode, and may send a second reference signal when processing a signal received from the relay 602 operating using a second mode. The UE 606 may adjust reception timing based on a change of the mode being used by the relay 602. The UE 606 may adjust a beam configuration used to communicate with the relay 602 based on an indication of a change of the relay's mode of operation. The UE may adjust an MCS used to communicate with the relay 602 based on an indication of a change of the relay's mode of operation.

Figure 7:
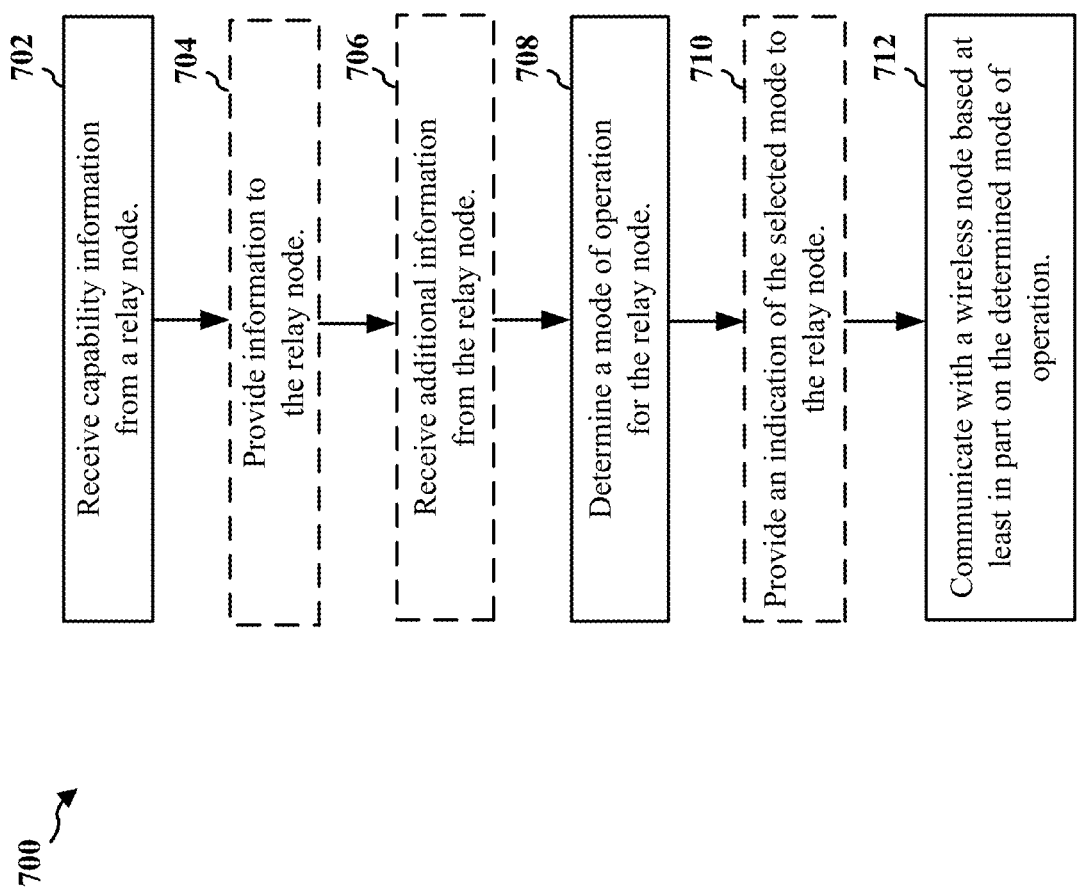
FIG. 7 is a flowchart of a method of wireless communication at a base station.

FIG. 7 is a flowchart 700 of a method of wireless communication. The method may be performed by a base station or a component of a base station (e.g., the base station 102, 180, 310, 604; the apparatus 802/802'; the processing system 914, which may include the memory 376 and which may be the entire base station 604 or a component of the base station 604, such as the TX processor 316, the RX processor 370, and/or the controller/processor 375). Optional aspects are illustrated with a dashed line.

At 702, the base station receives capability information from a relay node, the capability information indicating support for a first relay mode and a second relay mode. For example, the first relay mode may comprise an amplify and forward mode and the second relay mode may comprise a decode and forward mode. The reception of the capability information may be performed, e.g., by the capability information component 812 of the apparatus 802.

In some aspects, at 704, the base station provides information to the relay node, wherein the mode of operation is selected by the relay node based on the information. The information may be provided, e.g., by the relay information component 816 of the apparatus 802.

At 708, the base station determines a mode of operation for the relay node. The mode of operation may comprise the first relay mode or the second relay mode, e.g., the amplify and forward mode or the decode and forward mode. The determination may be performed, e.g., by the determination component 814 of the apparatus 802. For example, as part of the determination at 708, the base station may select the mode of operation. Then, the base station may further provide information, at 710, about the mode of operation determined by the base station. FIG. 6 illustrates an example where the base station determines the mode for the relay node and indicates the selected relay mode to the relay node and/or UE. Providing the information may include at least one of providing an indication of the determined mode of operation or providing rules or parameters based on which the mode of operation is selected by the relay node. The information may be provided as an indication of the mode of operation to the relay node in dynamic control information. The information may be provided as an indication of the mode of operation to the relay node in semi-static control information.

In some aspects, at 706, the base station may receive additional information from the relay node, e.g., as described in connection with 605, 607, and/or 609 in FIG. 6. The additional information may be received, e.g., by the additional information component 808 of the apparatus 802. The base station may determine the mode of operation based on the additional information from the relay node. For example, the additional information may comprise at least one of: a beam dependence for at least one of the first relay mode or the second relay mode, a noise characteristic of the relay node, a power gain parameter for the relay node, an output power parameter for the relay node, or a switching latency parameter for the relay node. The additional information may comprise at least one of: a first measurement report for a backhaul link between the relay node and the base station, a second measurement report for an access link between the relay node and at least one of a UE or a second relay node, or an SNR estimation for at least one of the first relay mode or the second relay mode.

As a part of the determination of the mode of operation, at 708, the base station may receive an indication from the relay node indicating the mode of operation. The base station may determine the mode of operation based on at least one of: information received from the relay node, uplink measurements of one or more signals transmitted by at least one of the relay node, a UE, or a second relay node, downlink measurements reported by a UE or the second relay node, a QoS requirement for the UE, or a topology of a backhaul network.

At 712, the base station communicates with the relay node based at least in part on the determined mode of operation. In some aspects, the wireless node may be the relay. The base station may communicate the selected mode to the relay. The communication may include receiving communication from the relay and/or transmitting communication to the relay based on the determined mode of operation. Therefore, the communication may be performed, e.g., by the reception component 804 and/or transmission component 810 of the apparatus 802. For example, the base station may schedule resources for the relay node or a wireless device served by the relay node based at least in part on the determined mode of operation for the relay node, wherein at least one of a communicate rate, the resources, or a serving beam are determined by the base station based on the determined mode of operation for the relay node. In some aspects, the wireless node may be a UE (e.g., a UE scheduled to communicate through the relay or which the base station will schedule to communicate through the relay). The base station may indicate the determined mode of operation to the UE.

Figure 8:
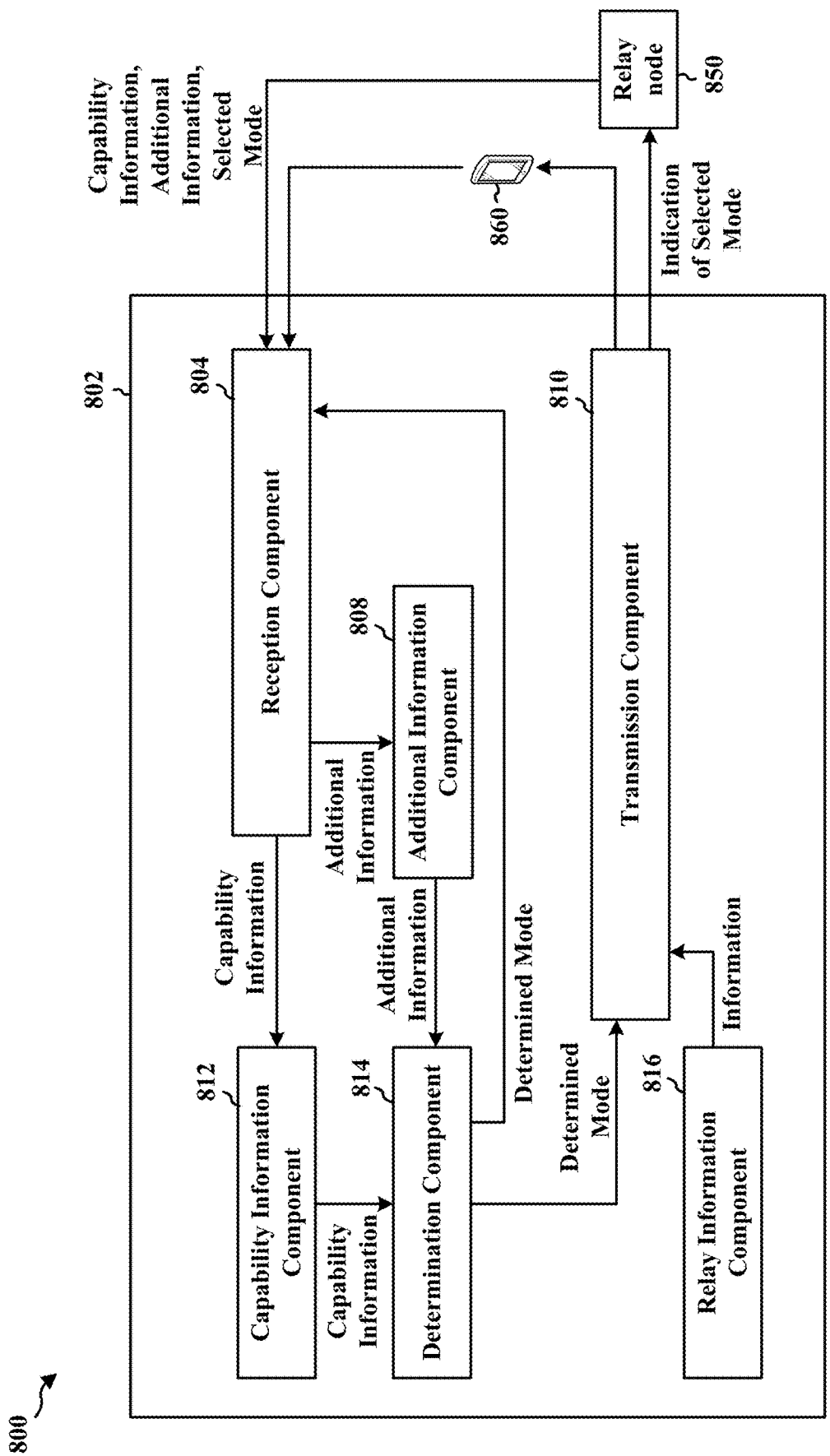
FIG. 8 is a conceptual data flow diagram illustrating the data flow between different means/components in an example apparatus.

FIG. 8 is a conceptual data flow diagram 800 illustrating the data flow between different means/components in an example apparatus 802. The apparatus may be a base station or a component of a base station. The apparatus includes a reception component 804 that that receives communication from the relay node 850 and/or from the UE 860. The reception component 804 may receive capability information, additional information and/or selected mode information from the relay node 850, and may communicate with the relay node 850 and/or the UE 860 based on a determined mode for the relay node 850, e.g., as described above in connection with 712 in FIG. 7. The apparatus includes a transmission component 810 configured to transmit communication to the relay node 850 and/or to the UE 860. The transmission component 810 may transmit an indication of a selected mode to the relay node 850, and may communicate with the relay node 850 and/or the UE 860 based on a determined mode for the relay node 850, e.g., as described above in connection with 712 in FIG. 7. The apparatus includes a capability information component 812 configured to receive capability information from the relay node 850, the capability information indicating support for a first relay mode and a second relay mode, e.g., as described in connection with 702 in FIG. 7. The apparatus includes an additional information component 808 configured to receive additional information from the relay node 850, wherein the base station determines the mode of operation based on the additional information from the relay node, e.g., as described in connection with 706 in FIG. 7. The apparatus includes a determination component 814 configured to determine a mode of operation for the relay node, e.g., as described above in connection with 708 in FIG. 7. The apparatus includes a relay information component 816 configured to provide information to the relay node, wherein the mode of operation is selected by the relay node based on the information, e.g., as described above in connection with 704 in FIG. 7.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
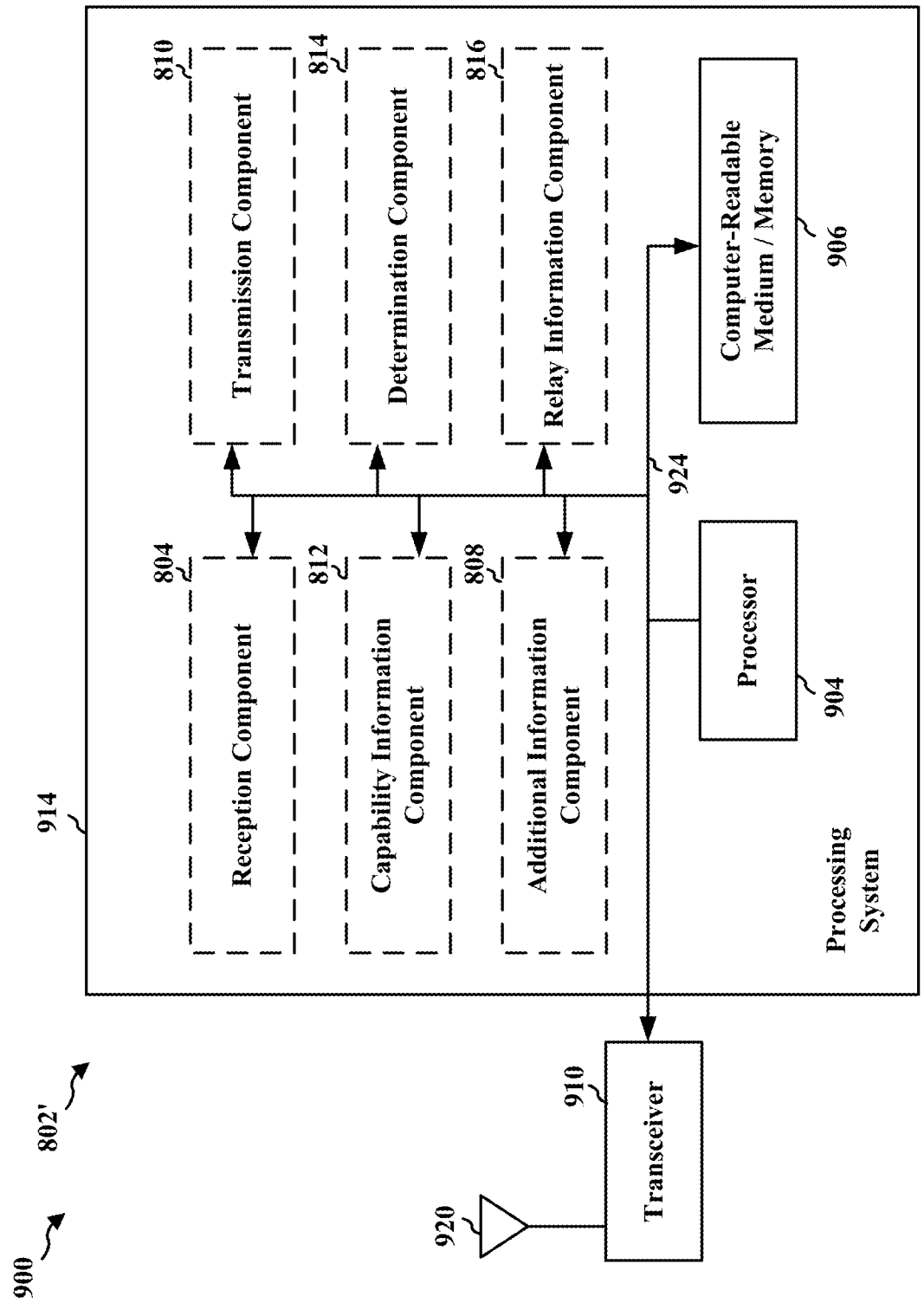
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 808, 810, 812, 814, and 816, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 810, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 808, 810, 812, 814, and 816. The components may be software components running in the processor 904, resident/stored in the computer readable medium/memory 906, one or more hardware components coupled to the processor 904, or some combination thereof. The processing system 914 may be a component of the base station 310 and may include the memory 376 and/or at least one of the TX processor 316, the RX processor 370, and the controller/processor 375. Alternatively, the processing system 914 may be the entire base station (e.g., see 310 of FIG. 3).

In one configuration, the apparatus 802/802' for wireless communication includes means for receiving capability information from a relay node and means for determining a mode of operation for the relay node. The apparatus may include means for providing information to the relay node. The apparatus may include means for receiving additional information from the relay node. The apparatus may include means for providing an indication of the selected mode to the relay node. The apparatus may include means for communicating with the relay node based at least in part on the determined mode of operation. The aforementioned means may be one or more of the aforementioned components of the apparatus 802 and/or the processing system 914 of the apparatus 802' configured to perform the functions recited by the aforementioned means. As described supra, the processing system 914 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 10:
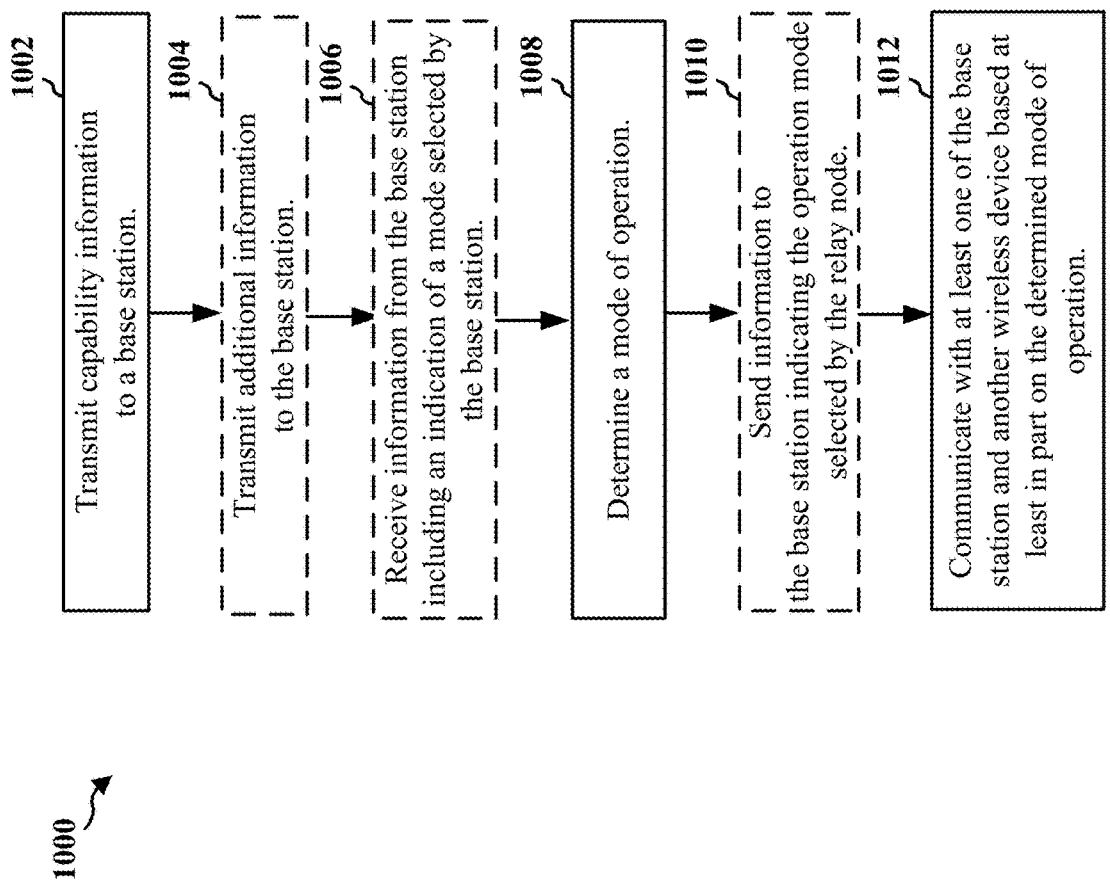
FIG. 10 is a flowchart of a method of wireless communication at a relay.

FIG. 10 is a flowchart 1000 of a method of wireless communication. The method may be performed by a relay node or a component of a relay node (e.g., relay 103, 500, 602; the apparatus 1102/1102'; or the processing system 1214, which may include the memory 360). Optional aspects are illustrated with a dashed line.

At 1002, the relay node transmits capability information to a base station, the capability information indicating support for a first relay mode and a second relay mode. The first relay mode may comprises an amplify and forward mode for full duplex communication and the second relay mode may comprise a decode and forward mode for half-duplex communication. The first relay mode or the second relay mode may be a default mode for the relay node. The transmission of the capability information may be performed, e.g., by the capability information component 1108 of the apparatus.

In some aspects, at 1004, the relay node transmits additional information to the base station, wherein the mode of operation is based on the additional information transmitted to the base station. The additional information may be transmitted, e.g., by the transmission component 1110 of the apparatus 1102. The additional information may comprise at least one of: a beam dependence for at least one of the first relay mode or the second relay mode, a noise characteristic of the relay node, a power gain parameter for the relay node, an output power parameter for the relay node, or a switching latency parameter for the relay node. The additional information may comprise at least one of: a first measurement report for a backhaul link between the relay node and the base station, a second measurement report for an access link between the relay node and at least one of a UE or a second relay node, or a SNR estimation for at least one of the first relay mode or the second relay mode.

In some aspects, at 1006, the relay node may receive information from the base station including an indication of a mode selected by the base station. The additional information may be received, e.g., by the base station information component 1112 of the apparatus 1102.

At 1008, the relay node determines a mode of operation, wherein the mode of operation comprises the first relay mode or the second relay mode. The determination may be performed, e.g., by the determination component 1114 of the apparatus 1102. The mode of operation may be determined based on information received from the base station. The information may include at least one of an indication of a mode selected by the base station or rules or parameters based on which the mode of operation is determined by the relay node. The information may include an indication of the mode of operation that is received from the base station in dynamic control information. The information may include an indication of the mode of operation that is received from the base station in semi-static control information. Determining the mode of operation, at 1008, may include changing between the first relay mode and the second relay mode. The relay node may determine the mode of operation based on at least one of: uplink measurements for one or more signals transmitted by a UE or a second relay node, downlink measurements reported by the UE or the second relay node, a QoS requirement for the UE, or a topology of a backhaul network. The relay node may determine the mode of operation based on at least one of: a beam used by the relay node, a child node served by the relay node, a type of channel relayed by the relay node, or a type of traffic relayed by the relay node.

In some aspects, at 1010, the relay node sends some information to the base station indicating the mode of operation selected by the relay node. The information indicating the mode of operation may be sent, e.g., by the determination component 1114 and/or the transmission component 1110 of the apparatus 1102.

At 1012, the relay node communicates with at least one of the base station or another wireless device based at least in part on the determined mode of operation. For example, the reception component 1104 may receive communication and/or the transmission component 1110 of the apparatus 1102 may transmit communication based on the determined mode of operation. The relay node may receive an allocation of resources from the base station based at least in part on the determined mode of operation for the relay node, wherein at least one of a communicate rate, the resources, or a serving beam are based on the determined mode of operation for the relay node.

Figure 11:
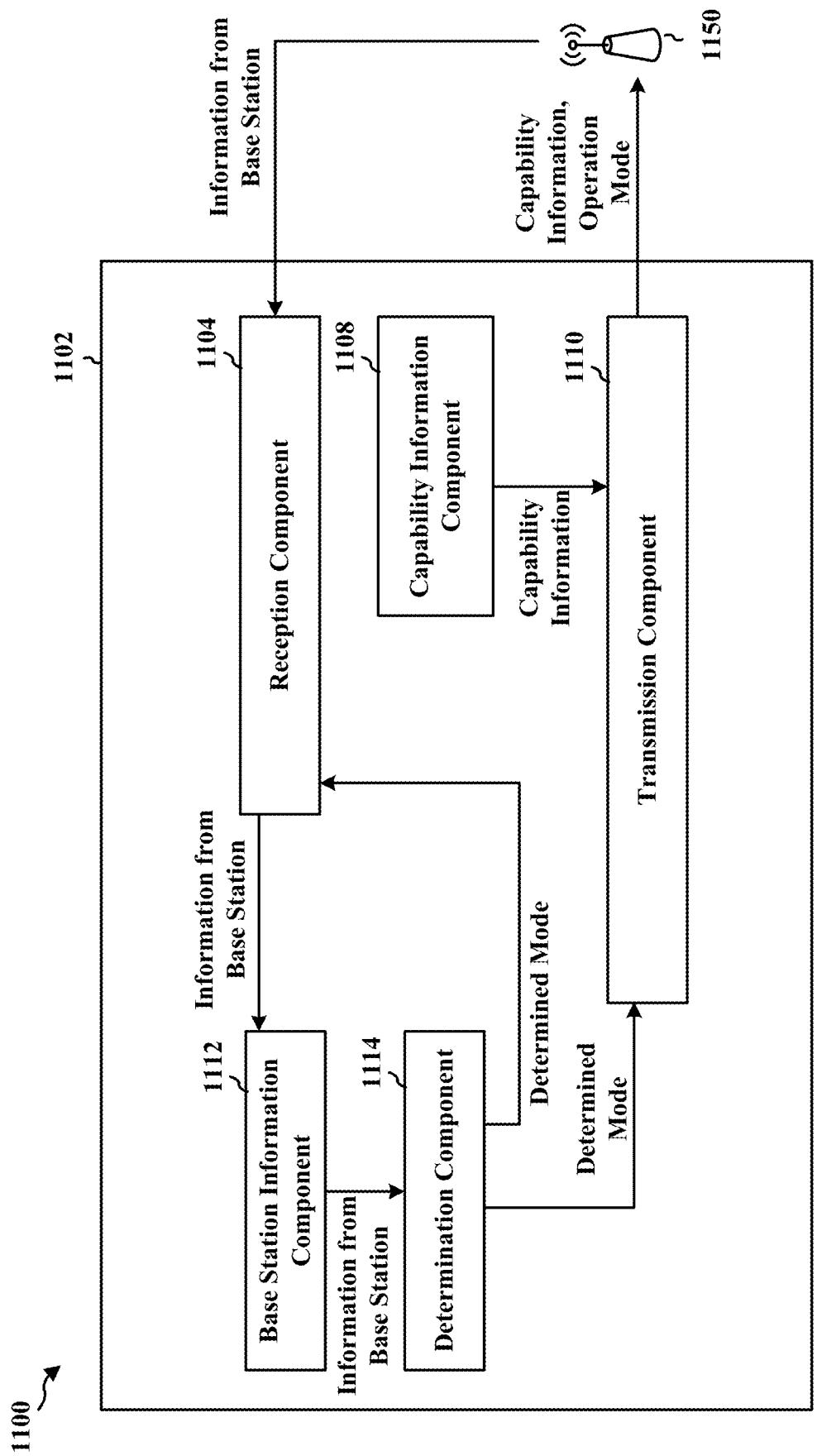
FIG. 11 is a conceptual data flow diagram illustrating the data flow between different means/components in an example apparatus.

FIG. 11 is a conceptual data flow diagram 1100 illustrating the data flow between different means/components in an example apparatus 1102. The apparatus may be a relay node or a component of a relay node. The apparatus includes reception component 804 that receives communication from a base station 1150 or from a UE or a child relay node. The reception component 804 may receive information from the base station 1150 and may be configured to communicate with the base station 1150 and/or wireless device served by the relay (such as a UE or child node) based on a determined mode for the relay mode 1102, e.g., as described above in connection with 1012 in FIG. 10. The apparatus includes a transmission component 1110 configured to transmit communication to the base station 1150. The transmission component 1110 may transmit capability information or an operation mode to the base station 1150, and may be configured to communicate with the base station 1150 based on a determined mode for the relay mode 1102, e.g., as described above in connection with 1012 in FIG. 10. The apparatus includes a base station information component 1112 configured to receive information from the base station including an indication of a mode selected by the base station, e.g., as described above in connection with 1006 in FIG. 10. The apparatus includes a determination component 1114 configured to determines a mode of operation, wherein the mode of operation comprises the first relay mode or the second relay mode, as described above in connection with 1008 in FIG. 10. The apparatus includes a capability information component 1108 configured to transmit capability information to a base station, the capability information indicating support for a first relay mode and a second relay mode, e.g., as described above in connection with 1002 in FIG. 10.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
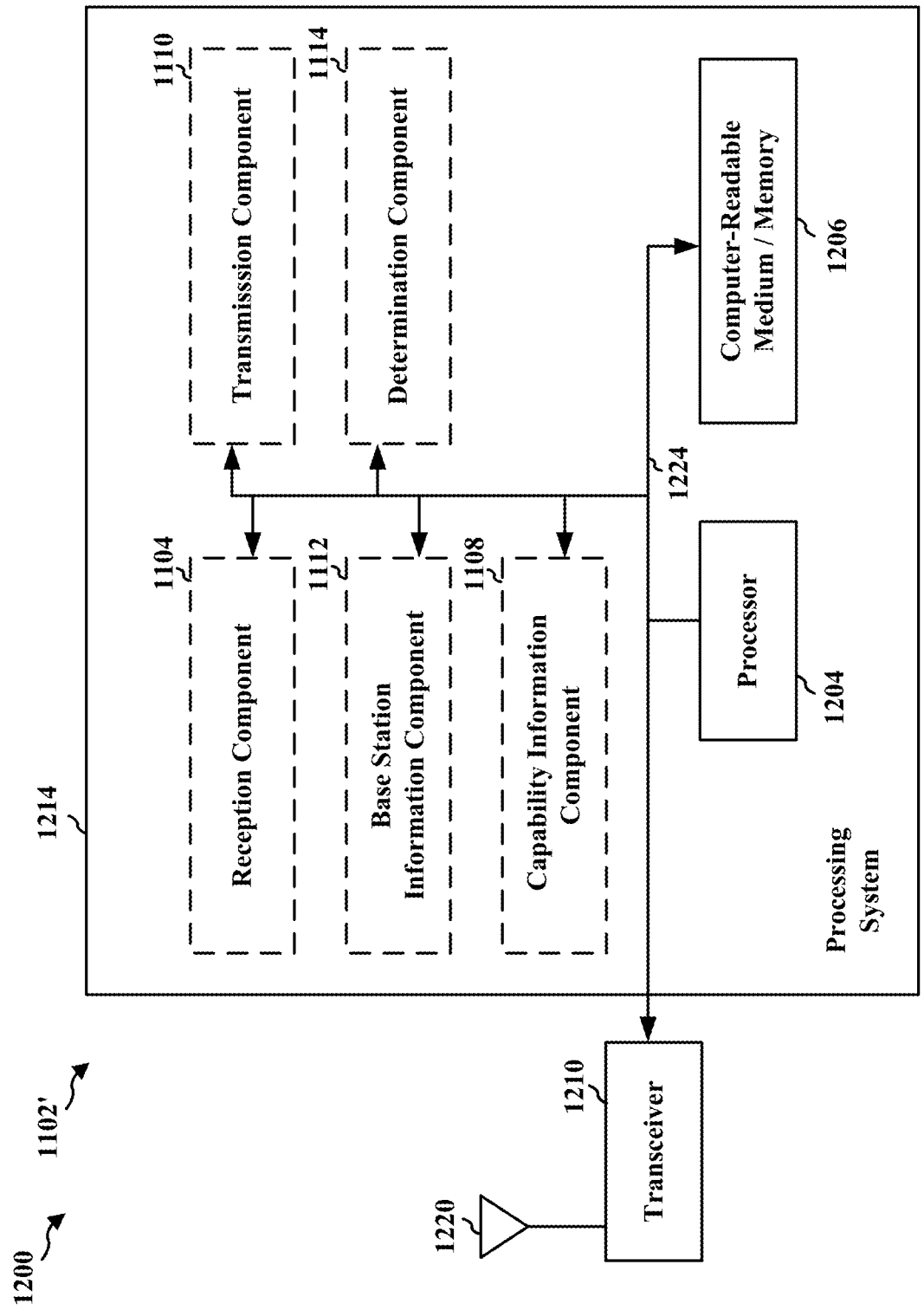
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1108, 1110, 1112, and 1114, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1110, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1108, 1110, 1112, and 1114. The components may be software components running in the processor 1204, resident/stored in the computer readable medium/memory 1206, one or more hardware components coupled to the processor 1204, or some combination thereof.

In one configuration, the apparatus 1102/1102' for wireless communication includes means for transmitting capability information to a base station and means for determining a mode of operation. The apparatus may include means for transmitting additional information to the base station. The apparatus may include means for receiving information from the base station including an indication of a mode selected by the base station. The apparatus may include means for sending information to the base station indicating the operation mode selected by the relay node. The apparatus may include means for communicating with at least one of the base station and another wireless device based at least in part on the determined mode of operation. The aforementioned means may be one or more of the aforementioned components of the apparatus 1102 and/or the processing system 1214 of the apparatus 1102' configured to perform the functions recited by the aforementioned means. The processing system 1214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 13:
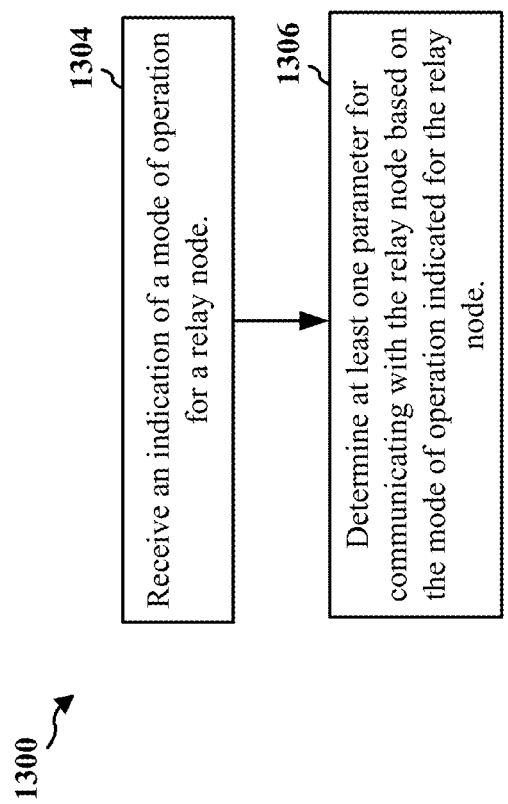
FIG. 13 is a flowchart of a method of wireless communication at a UE.

FIG. 13 is a flowchart 1300 of a method of wireless communication at a wireless device served by a relay node. The method may be performed by a UE or a component of a UE (e.g., the UE 104, 350, 606), by another relay node or a component of a relay node (e.g., a child node of the relay node), by the apparatus 1402/1402'; the processing system 1514, which may include the memory 360 and which may be a relay node, a relay node component or an entire UE 350 or a component of the UE 350, such as the TX processor 368, the RX processor 356, and/or the controller/processor 359).

At 1302, the wireless device receives an indication of a mode of operation for the relay node. The indication may indicate a first relay mode or a second relay mode. The first relay mode may comprise an amplify and forward mode, and the second relay mode may comprise a decode and forward mode. The wireless device may be a UE served by the relay node or a child node of the relay node. The indication may be received from the relay node. The indication may be received from a base station. The indication may be received, e.g., by the indicated mode component 1412 and/or reception component 1404 of the apparatus 1402.

At 1304, the wireless device determines at least one parameter for communicating with the relay node based on the mode of operation indicated for the relay node. The determination may be performed, e.g., by the communication parameter determination component 1414 of the apparatus 1402. A parameter that is determined based on the mode of operation indicated for the relay node may include an MCS used to communicate with the relay node. A parameter that is determined based on the mode of operation indicated for the relay node may include a reception timing to communicate with the relay node. A parameter that is determined based on the mode of operation indicated for the relay node may include a reference signal used to communicate with the relay node. A parameter that is determined based on the mode of operation indicated for the relay node may include a beam configuration used to communicate with the relay node. In some examples, when the wireless device is a child relay node of the relay node, the child relay node may determine its own mode of operation (which may be referred to as a relay node mode of operation) based on the mode of operation of the relay node serving the child relay node.

The wireless device may receive an allocation of resources from a base station based at least in part on the determined mode of operation for the relay node. A communication rate, the scheduled resources, and/or a serving beam may be based on the mode of operation for the relay node.

Figure 14:
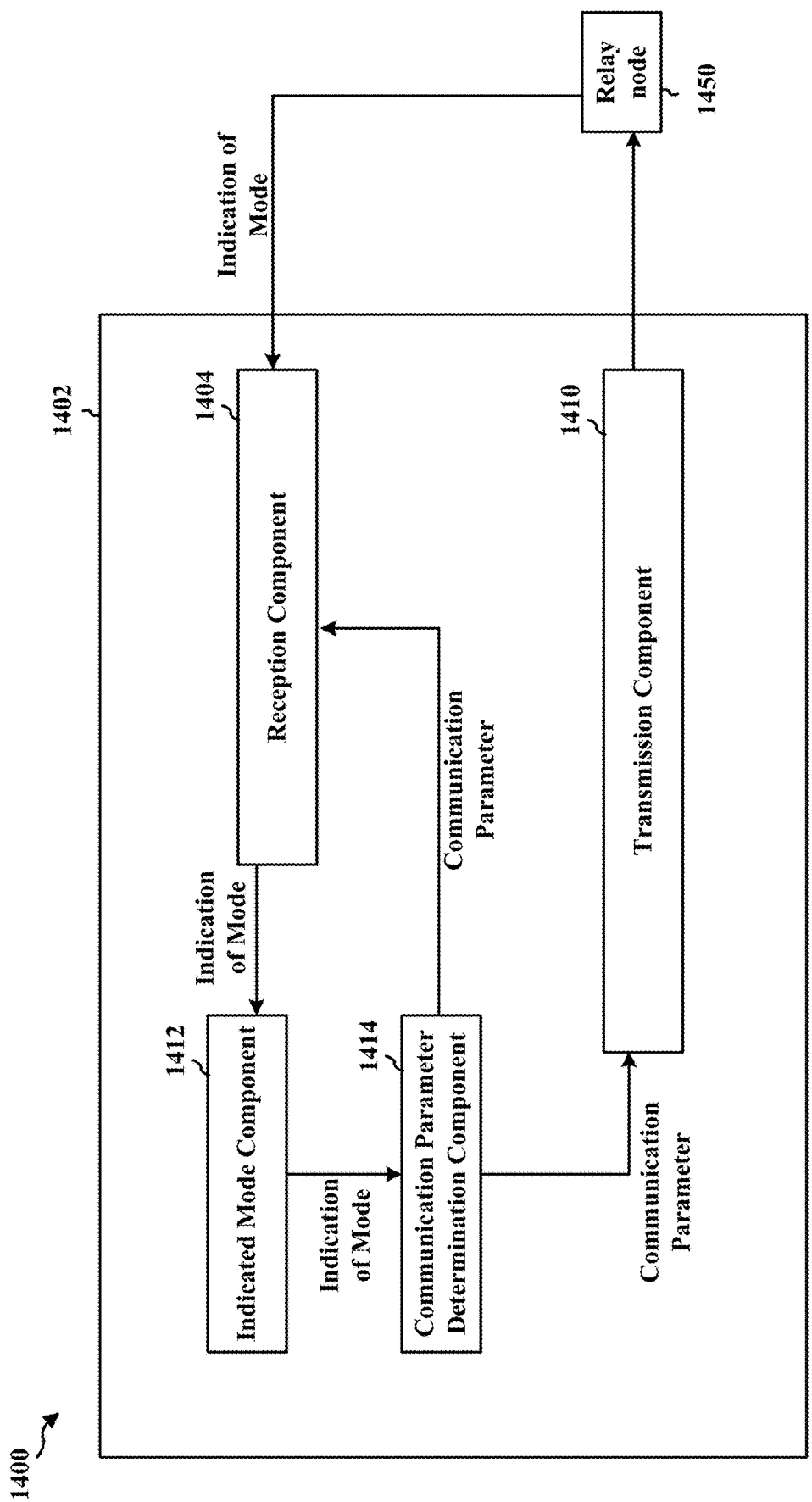
FIG. 14 is a conceptual data flow diagram illustrating the data flow between different means/components in an example apparatus.

FIG. 14 is a conceptual data flow diagram 1400 illustrating the data flow between different means/components in an example apparatus 1402. The apparatus may be a UE or a component of a UE. The apparatus may be a child relay node served by the relay node or a component of such a child relay node. The apparatus includes a reception component 1404 that receives communication from the relay node 1450 and/or from a base station. The apparatus includes a transmission component 1410 configured to transmit communication to the relay node 1450 and/or to a base station. The apparatus includes an indicated mode component 1412 configured to receive an indication of a mode of operation for the relay node, wherein the indication indicates a first relay mode or a second relay mode, e.g., as described in connection with 1302 in FIG. 13. The apparatus includes a communication parameter determination component 1414 that determines at least one parameter for communicating with the relay node based on the mode of operation indicated for the relay node, e.g., as described in connection with 1304 in FIG. 13.

The apparatus may include additional components that perform each of the blocks of the algorithm in the aforementioned flowchart of FIG. 13. As such, each block in the aforementioned flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
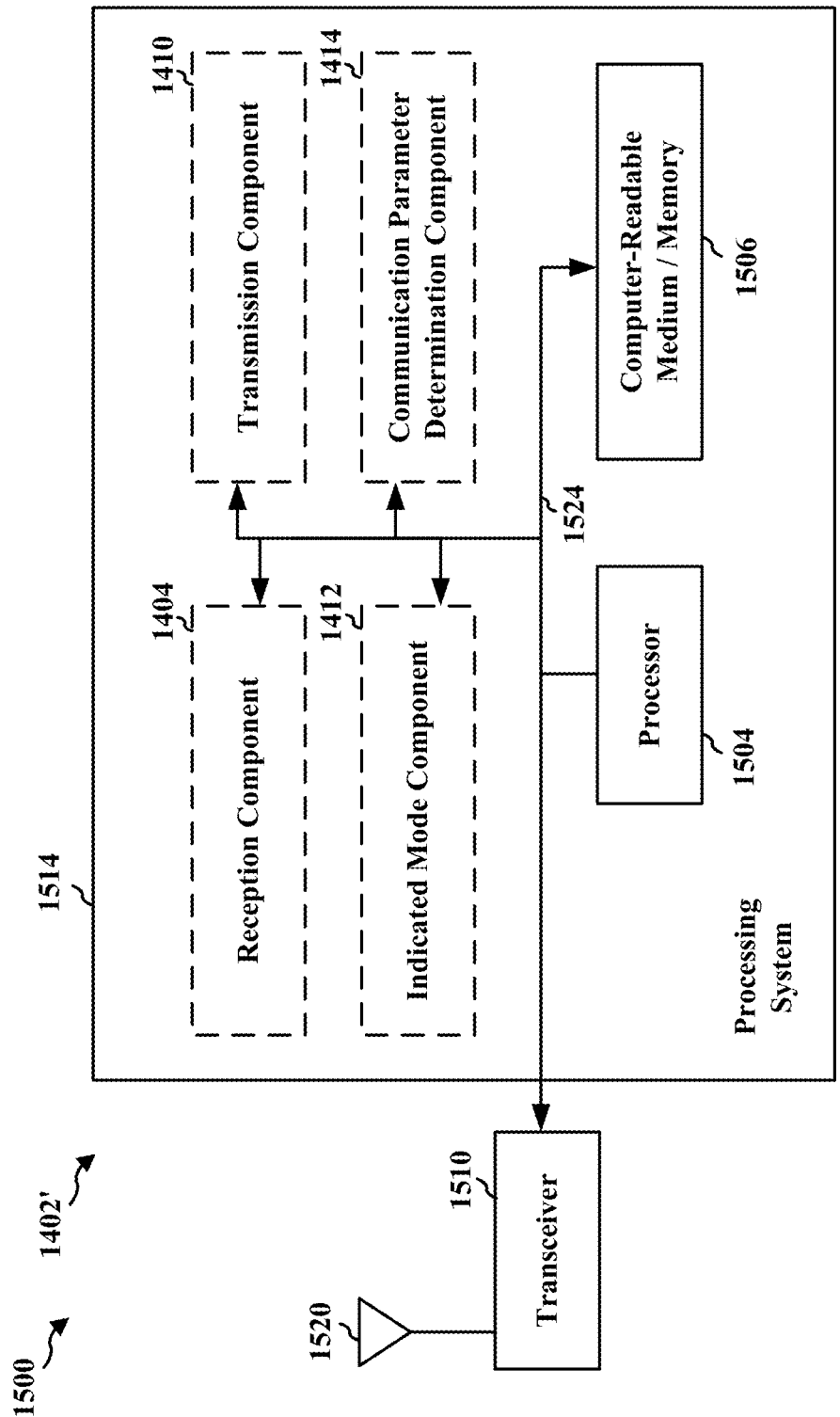
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1410, 1412, 1414, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1410, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1410, 1412, 1414. The components may be software components running in the processor 1504, resident/stored in the computer readable medium/memory 1506, one or more hardware components coupled to the processor 1504, or some combination thereof. The processing system 1514 may be a component of the UE 350 and may include the memory 360 and/or at least one of the TX processor 368, the RX processor 356, and the controller/processor 359. Alternatively, the processing system 1514 may be the entire UE (e.g., see 350 of FIG. 3).

In one configuration, the apparatus 1402/1402' for wireless communication includes means for receiving an indication of a mode of operation for the relay node from a first relay mode to a second relay mode and means for determining at least one parameter for communicating with the relay node based on the mode of operation indicated for the relay node. The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means. Further disclosure is included in the Appendix.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a relay node, comprising:
   transmitting capability information to a base station, the capability information indicating support for a first relay mode and a second relay mode, wherein the first relay mode comprises an amplify and forward mode and the second relay mode comprises a decode and forward mode;
   transmitting additional information to the base station, wherein the additional information comprises a beam dependence for at least one of the first relay mode or the second relay mode;
   determining a mode of operation, wherein the mode of operation comprises the first relay mode or the second relay mode, wherein the mode of operation is based on the additional information transmitted to the base station; and
   communicating with at least one of the base station or another wireless device based at least in part on the determined mode of operation.

2. The method of claim 1, wherein the mode of operation is determined based on information received from the base station.

3. The method of claim 2, wherein the information includes at least one of an indication of a mode selected by the base station or rules or parameters based on which the mode of operation is determined by the relay node.

4. The method of claim 2, wherein the information includes an indication of the mode of operation that is received from the base station in dynamic control information.

5. The method of claim 2, wherein the information includes an indication of the mode of operation that is received from the base station in semi-static control information.

6. The method of claim 1, further comprising sending some information to the base station indicating the mode of operation selected by the relay node.

7. The method of claim 1, wherein the first relay mode is for full duplex communication and the second relay mode is for half-duplex communication.

8. The method of claim 1, wherein the additional information further comprises at least one of:
   a noise characteristic of the relay node,
   a power gain parameter for the relay node, an output power parameter for the relay node, or
a switching latency parameter for the relay node.

9. The method of claim 1, wherein the additional information further comprises at least one of:
a first measurement report for a backhaul link between the relay node and the base station,
a second measurement report for an access link between the relay node and at least one of a user equipment (UE) or a second relay node, or
a signal to noise ratio (SNR) estimation for at least one of the first relay mode or the second relay mode.

10. The method of claim 1, wherein determining the mode of operation includes changing between the first relay mode and the second relay mode.

11. The method of claim 1, wherein the relay node determines the mode of operation based on at least one of:
uplink measurements for one or more signals transmitted by a user equipment (UE) or a second relay node,
downlink measurements reported by the UE or the second relay node,
a quality of service (QoS) requirement for the UE, or
a topology of a backhaul network.

12. The method of claim 1, wherein the first relay mode or the second relay mode is a default mode for the relay node.

13. The method of claim 1, wherein the relay node determines the mode of operation based on at least one of:
a beam used by the relay node,
a child node served by the relay node,
a type of channel relayed by the relay node, or
a type of traffic relayed by the relay node.

14. The method of claim 1, wherein the relay node receives an allocation of resources from the base station based at least in part on the determined mode of operation for the relay node, wherein at least one of a communicate rate, the resources, or a serving beam are based on the determined mode of operation for the relay node.

15. An apparatus for wireless communication at a relay node, comprising:
a memory; and
at least one processor coupled to the memory and configured to:
transmit capability information to a base station, the capability information indicating support for a first relay mode and a second relay mode, wherein the first relay mode comprises an amplify and forward mode and the second relay mode comprises a decode and forward mode;
transmit additional information to the base station, wherein the additional information comprises a beam dependence for at least one of the first relay mode or the second relay mode;
determine a mode of operation, wherein the mode of operation comprises the first relay mode or the second relay mode, wherein the mode of operation is based on the additional information transmitted to the base station; and
communicate with at least one of the base station or another wireless device based at least in part on the determined mode of operation.

16. The apparatus of claim 15, wherein the mode of operation is determined based on information received from the base station.

17. The apparatus of claim 16, wherein the information includes at least one of an indication of a mode selected by the base station or rules or parameters based on which the mode of operation is determined by the processor.

18. The apparatus of claim 16, wherein the information includes an indication of the mode of operation that is received from the base station in dynamic control information.

19. The apparatus of claim 16, wherein the information includes an indication of the mode of operation that is received from the base station in semi-static control information.

20. The apparatus of claim 15, wherein the processor is further configured to sending some information to the base station indicating the mode of operation selected by the processor.

21. The apparatus of claim 15, wherein the first relay mode is for full duplex communication and the second relay mode is for half-duplex communication.

22. The apparatus of claim 15, wherein the additional information further comprises at least one of:
a noise characteristic of the relay node,
a power gain parameter for the relay node,
an output power parameter for the relay node, or
a switching latency parameter for the relay node.

23. The apparatus of claim 15, wherein the additional information further comprises at least one of:
a first measurement report for a backhaul link between the relay node and the base station,
a second measurement report for an access link between the relay node and at least one of a user equipment (UE) or a second relay node, or
a signal to noise ratio (SNR) estimation for at least one of the first relay mode or the second relay mode.

24. The apparatus of claim 15, wherein determining the mode of operation includes changing between the first relay mode and the second relay mode.

25. The apparatus of claim 15, wherein the relay node determines the mode of operation based on at least one of:
uplink measurements for one or more signals transmitted by a user equipment (UE) or a second relay node,
downlink measurements reported by the UE or the second relay node,
a quality of service (QoS) requirement for the UE, or
a topology of a backhaul network.

26. The apparatus of claim 15, wherein the first relay mode or the second relay mode is a default mode for the relay node.

27. The apparatus of claim 15, wherein the relay node determines the mode of operation based on at least one of:
a beam used by the relay node,
a child node served by the relay node,
a type of channel relayed by the relay node, or
a type of traffic relayed by the relay node.

28. The apparatus of claim 15, wherein the relay node receives an allocation of resources from the base station based at least in part on the determined mode of operation for the relay node, wherein at least one of a communicate rate, the resources, or a serving beam are based on the determined mode of operation for the relay node.

29. An apparatus for wireless communication at a relay node, comprising:
means for transmitting capability information to a base station, the capability information indicating support for a first relay mode and a second relay mode, wherein the first relay mode comprises an amplify and forward mode and the second relay mode comprises a decode and forward mode;

means for transmitting additional information to the base station, wherein the additional information comprises a beam dependence for at least one of the first relay mode or the second relay mode;

means for determining a mode of operation, wherein the mode of operation comprises the first relay mode or the second relay mode, wherein the mode of operation is based on the additional information transmitted to the base station; and means for communicating with at least one of the base station or another wireless device based at least in part on the determined mode of operation.

30. The apparatus of claim 29, wherein the mode of operation is determined based on information received from the base station.

31. The apparatus of claim 30, wherein the information includes at least one of an indication of a mode selected by the base station or rules or parameters based on which the mode of operation is determined by the relay node.

32. The apparatus of claim 30, wherein the information includes an indication of the mode of operation that is received from the base station in dynamic control information.

33. The apparatus of claim 30, wherein the information includes an indication of the mode of operation that is received from the base station in semi-static control information.

34. The apparatus of claim 29, further comprising sending some information to the base station indicating the mode of operation selected by the relay node.

35. The apparatus of claim 29, wherein the first relay mode is for full duplex communication and the second relay mode is for half-duplex communication.

36. The apparatus of claim 29, wherein the additional information comprises at least one of:
a noise characteristic of the relay node,
a power gain parameter for the relay node,
an output power parameter for the relay node, or
a switching latency parameter for the relay node.

37. The apparatus of claim 29, wherein the additional information comprises at least one of
a first measurement report for a backhaul link between the relay node and the base station,
a second measurement report for an access link between the relay node and at least one of a user equipment (UE) or a second relay node, or
a signal to noise ratio (SNR) estimation for at least one of the first relay mode or the second relay mode.

38. The apparatus of claim 29, wherein determining the mode of operation includes changing between the first relay mode and the second relay mode.

39. The apparatus of claim 29, wherein the relay node determines the mode of operation based on at least one of:
uplink measurements for one or more signals transmitted by a user equipment (UE) or a second relay node,
downlink measurements reported by the UE or the second relay node,
a quality of service (QoS) requirement for the UE, or
a topology of a backhaul network.

40. The apparatus of claim 29, wherein the first relay mode or the second relay mode is a default mode for the relay node.

41. The apparatus of claim 29, wherein the relay node determines the mode of operation based on at least one of:
a beam used by the relay node,
a child node served by the relay node,
a type of channel relayed by the relay node, or
a type of traffic relayed by the relay node.

42. The apparatus of claim 29, wherein the relay node receives an allocation of resources from the base station based at least in part on the determined mode of operation for the relay node, wherein at least one of a communicate rate, the resources, or a serving beam are based on the determined mode of operation for the relay node.

43. A computer-readable medium storing computer executable code for wireless communication at a relay node, the code when executed by a processor cause the processor to:

transmit capability information to a base station, the capability information indicating support for a first relay mode and a second relay mode, wherein the first relay mode comprises an amplify and forward mode and the second relay mode comprises a decode and forward mode;

transmit additional information to the base station, wherein the additional information comprises a beam dependence for at least one of the first relay mode or the second relay mode;

determine a mode of operation, wherein the mode of operation comprises the first relay mode or the second relay mode, wherein the mode of operation is based on the additional information transmitted to the base station; and communicate with at least one of the base station or another wireless device based at least in part on the determined mode of operation.

44. The computer-readable medium of claim 43, wherein the mode of operation is determined based on information received from the base station.

45. The computer-readable medium of claim 44, wherein the information includes at least one of an indication of a mode selected by the base station or rules or parameters based on which the mode of operation is determined by the relay node.

46. The computer-readable medium of claim 44, wherein the information includes an indication of the mode of operation that is received from the base station in dynamic control information.

47. The computer-readable medium of claim 44, wherein the information includes an indication of the mode of operation that is received from the base station in semi-static control information.

48. The computer-readable medium of claim 43, wherein the code causes the processor to send some information to the base station indicating the mode of operation selected by the relay node.

49. The computer-readable medium of claim 43, wherein the first relay mode is for full duplex communication and the second relay mode is for half-duplex communication.

50. The computer-readable medium of claim 43, wherein the additional information comprises at least one of:
a noise characteristic of the relay node,
a power gain parameter for the relay node,
an output power parameter for the relay node, or
a switching latency parameter for the relay node.

51. The computer-readable medium of claim 43, wherein the additional information comprises at least one of:
a first measurement report for a backhaul link between the relay node and the base station,
a second measurement report for an access link between the relay node and at least one of a user equipment (UE) or a second relay node, or
a signal to noise ratio (SNR) estimation for at least one of the first relay mode or the second relay mode.

52. The computer-readable medium of claim 43, wherein determining the mode of operation includes changing between the first relay mode and the second relay mode.

53. The computer-readable medium of claim 43, wherein the relay node determines the mode of operation based on at least one of:
   uplink measurements for one or more signals transmitted by a user equipment (UE) or a second relay node,
   downlink measurements reported by the UE or the second relay node,
   a quality of service (QoS) requirement for the UE, or
   a topology of a backhaul network.

54. The computer-readable medium of claim 43, wherein the first relay mode or the second relay mode is a default mode for the relay node.

55. The computer-readable medium of claim 43, wherein the relay node determines the mode of operation based on at least one of:
   a beam used by the relay node,
   a child node served by the relay node,
   a type of channel relayed by the relay node, or
   a type of traffic relayed by the relay node.

56. The computer-readable medium of claim 43, wherein the relay node receives an allocation of resources from the base station based at least in part on the determined mode of operation for the relay node, wherein at least one of a communicate rate, the resources, or a serving beam are based on the determined mode of operation for the relay node.

\* \* \* \* \*